United States Patent

Crofton et al.

(10) Patent No.: US 10,460,107 B2
(45) Date of Patent: Oct. 29, 2019

(54) SYSTEMS AND METHODS FOR AUTOMATIC SNAPSHOTTING OF BACKUPS BASED ON MALICIOUS MODIFICATION DETECTION

(71) Applicant: Carbonite, Inc., Boston, MA (US)

(72) Inventors: Teo Winton Crofton, Sudbury, MA (US); Clark Marshall Baker, Belmont, MA (US)

(73) Assignee: Carbonite, Inc., Boston, MA (US)

( * ) Notice: Subject to any disclaimer, the term of this patent is extended or adjusted under 35 U.S.C. 154(b) by 0 days.

(21) Appl. No.: 16/044,558

(22) Filed: Jul. 25, 2018

(65) Prior Publication Data

US 2018/0330088 A1 Nov. 15, 2018

Related U.S. Application Data

(63) Continuation of application No. 14/971,836, filed on Dec. 16, 2015, now Pat. No. 10,083,299.

(51) Int. Cl.
*G06F 21/56* (2013.01)
*G06F 11/14* (2006.01)
(Continued)

(52) U.S. Cl.
CPC ........ *G06F 21/565* (2013.01); *G06F 11/1464* (2013.01); *G06F 16/113* (2019.01);
(Continued)

(58) Field of Classification Search
USPC ........................................................ 726/23
See application file for complete search history.

(56) References Cited

U.S. PATENT DOCUMENTS 5,778,395 A 7/1998 Whiting et al.
7,636,872 B2 12/2009 Kramer et al.
(Continued)

OTHER PUBLICATIONS

U.S. Appl. No. 14/971,836, Office Action Communication dated Nov. 29, 2017, pp. 1-24.
(Continued)

*Primary Examiner* — Taghi T Arani
*Assistant Examiner* — Badridot Champakesanatusptodotgov
(74) *Attorney, Agent, or Firm* — Mark Chadurjian, Esq.; Gibb & Riley, LLC

(57) ABSTRACT

The present disclosure describes systems and methods for detection and mitigation of malicious activity regarding user data by a network backup system. In a first aspect, a backup system receiving and deduplicating backup data from a plurality of computing devices may detect, based on changes in uniqueness or shared rates for files, atypical modifications to common files, and may take steps to mitigate any potential attack by maintaining versions of the common files prior to the modifications or locking backup snapshots. In a second aspect, the backup system may monitor file modification behaviors on a single device, relative to practices of an aggregated plurality of devices. Upon detection of potentially malicious modification activity, a previously backed up or synchronized store of data may be locked and/or duplicated, preventing any of the malicious modifications from being transferred to the backup system.

20 Claims, 11 Drawing Sheets

(51) Int. Cl.
*G06F 21/60* (2013.01)
*G06F 16/11* (2019.01)

(52) U.S. Cl.
CPC ......... *G06F 21/566* (2013.01); *G06F 21/568* (2013.01); *G06F 21/60* (2013.01); *G06F 2201/84* (2013.01); *G06F 2221/034* (2013.01)

(56) References Cited

U.S. PATENT DOCUMENTS

| | | | | |
|---|---|---|---|---|
| 7,681,069 | B1* | 3/2010 | Chellappa | G06F 11/1435 711/161 |
| 7,779,472 | B1* | 8/2010 | Lou | G06F 21/566 726/22 |
| 7,899,782 | B1 | 3/2011 | Oganesyan | |
| 7,921,258 | B1* | 4/2011 | Panabaker | G06F 11/1458 711/126 |
| 8,104,090 | B1* | 1/2012 | Pavlyushchik | G06F 21/55 713/188 |
| 8,260,750 | B1* | 9/2012 | Gugick | G06F 11/1461 707/645 |
| 8,443,449 | B1 | 5/2013 | Fan et al. | |
| 8,468,604 | B2 | 6/2013 | Claudatos et al. | |
| 8,495,037 | B1* | 7/2013 | Westenberg | G06F 11/1448 707/698 |
| 8,548,944 | B2* | 10/2013 | Yueh | G06F 11/1435 707/624 |
| 8,875,294 | B2 | 10/2014 | Golavanov | |
| 8,918,863 | B1* | 12/2014 | Pendse | H04L 67/1097 707/640 |
| 9,110,848 | B1* | 8/2015 | Kim | G06F 11/0709 |
| 9,152,685 | B2* | 10/2015 | Kavuri | G06F 3/0647 |
| 9,317,376 | B1* | 4/2016 | Bushman | G06F 16/162 |
| 9,471,245 | B1* | 10/2016 | Shilane | G06F 11/2056 |
| 9,734,189 | B2 | 8/2017 | Chauvet et al. | |
| 9,946,608 | B1* | 4/2018 | Per | G06F 11/1461 |
| 10,083,299 | B2* | 9/2018 | Crofton | G06F 16/113 |
| 2005/0240637 | A1* | 10/2005 | Kawamura | G06F 11/1461 |
| 2006/0218439 | A1 | 9/2006 | Carter-Schwendler et al. | |
| 2007/0288526 | A1* | 12/2007 | Mankad | G06F 16/27 |
| 2008/0195676 | A1* | 8/2008 | Lyon | G06F 11/1469 |
| 2009/0144545 | A1* | 6/2009 | Dhuvur | G06F 21/552 713/165 |
| 2011/0082838 | A1* | 4/2011 | Niemela | G06F 11/1458 707/654 |
| 2012/0016839 | A1* | 1/2012 | Yueh | G06F 11/1435 707/624 |
| 2012/0089580 | A1* | 4/2012 | Yamashita | G06F 16/23 707/695 |
| 2013/0073819 | A1* | 3/2013 | Havewala | G06F 16/128 711/162 |
| 2014/0074787 | A1* | 3/2014 | Berman | G06F 11/1451 707/639 |
| 2015/0067860 | A1* | 3/2015 | Levow | H04L 63/145 726/24 |
| 2015/0212895 | A1 | 7/2015 | Pawar et al. | |
| 2015/0212897 | A1 | 7/2015 | Kottomtharayil et al. | |
| 2015/0363270 | A1* | 12/2015 | Hammer | G06F 16/00 711/162 |
| 2016/0077924 | A1 | 3/2016 | Todd et al. | |
| 2016/0149902 | A1* | 5/2016 | Arunkumar | H04L 63/0846 713/178 |
| 2016/0202925 | A1* | 7/2016 | Dain | G06F 3/0619 714/6.22 |
| 2017/0091047 | A1* | 3/2017 | Bangalore | G06F 11/1461 |

OTHER PUBLICATIONS

U.S. Appl. No. 14/971,836, Office Action Communication dated May 24, 2017, pp. 1-25.
U.S. Appl. No. 14/971,836, Advisory Action dated Feb. 27, 2018, pp. 1-3.
U.S. Appl. No. 14/971,836, Notice of Allowance Communication dated Jun. 25, 2018, pp. 1-13.

* cited by examiner

| Backup Status File 118 | | | |
|---|---|---|---|
| File A 202a | Hash A 204a | Prior Hash A 204a' | Location A 206a |
| File B 202b | Hash B 204b | Prior Hash B 204b' | Location B 206b |
| ⋮ | ⋮ | ⋮ | ⋮ |
| File N 202n | Hash N 204n | Prior Hash N 204n' | Location N 206n |

*FIG. 2A*

| Data Hash Table 152 | | | | |
|---|---|---|---|---|
| Hash A 204a | Location A 206a | Device ID(s) 208a | Shared rate 210a | Prior Hash A 204a' |
| Hash B 204b | Location B 206b | Device ID(s) 208b | Shared rate 210b | Prior Hash B 204b' |
| ⋮ | ⋮ | ⋮ | ⋮ | ⋮ |
| Hash N 204n | Location N 206n | Device ID(s) 208n | Shared rate 210n | Prior Hash N 204n' |

*FIG. 2B*

SYSTEMS AND METHODS FOR AUTOMATIC SNAPSHOTTING OF BACKUPS BASED ON MALICIOUS MODIFICATION DETECTION

CROSS-REFERENCE TO RELATED APPLICATIONS

The present invention claims the benefit under 35 U.S.C. § 120 as a divisional of U.S. patent application Ser. No. 14/971,836 filed on Dec. 16, 2015, now issued as U.S. Pat. No. 10,083,299 on Sep. 25, 2018, the entire teachings of which are incorporated herein by reference.

FIELD OF THE INVENTION

The present application relates to systems and methods for detection and mitigation of malicious activity regarding user data by a network backup system.

BACKGROUND

Malicious actors may try to gain access to and corrupt user data on computing devices for various purposes. For example, malicious code may be distributed via a computer trojan, virus, or self-replicating worm, and in one implementation, when executed on a computing device may encrypt user data with a strong encryption algorithm. The code may generate a message to the user, offering to unlock or decrypt their files in exchange for monetary payments. As brute-force decryption of the files may take years, many users will reluctantly pay the ransom. Other malicious code may be distributed to sabotage data or applications for indirect economic gain, to cause damage, or out of malevolence or mischievousness.

Defending against such attacks is difficult, particularly with computing devices that are connected to the Internet. Typical countermeasures include anti-virus applications that execute on the computing device and scan received data for code segments or signatures matching a library. The library needs to be updated frequently to catch newly developed attacks, and accordingly, if the computing device receives the malicious code before the library is updated, the anti-virus application may not be able to detect or prevent the damage. Such attacks may be referred to as zero-day attacks, as they strike without any pre-warning or opportunity to apply library-based countermeasures.

SUMMARY

The present disclosure describes systems and methods for detection and mitigation of malicious activity regarding user data by a network backup system. Network backup systems, sometimes referred to as cloud backup systems, online backup systems, or by other similar terms, receive data from a large number of computing devices for remote archival and restoration. While some data is unique or personal to a user of a computing device, such as documents and photos, a large portion of backed up data is common or shared by many devices, such as operating system files, applications, widely shared media files, etc. In some implementations, backup systems don't back up these files, as they're easily replaceable from installation media. In other implementations, backup systems may use de-duplication or single-instance storage algorithms to back up only a single copy of the common files, avoiding having to retain multiple copies of the same data and reducing storage requirements and network bandwidth usage.

In typical usage, these common or shared files may not be modified. Rather, each client device may retain identical copies until system upgrades or patches are applied. Such upgrades may be publicized ahead of time, and/or may be applied on a large number of devices simultaneously via automatic or periodic upgrade systems. While individual devices may not necessarily apply upgrades at the same time, the common files will exist on normal, uncorrupted devices in one of a plurality of common states (e.g. a latest version or build, a prior version, a version prior to that, etc.), and each state may be shared by a large plurality of devices (e.g. 60% of the devices having the application in a current version, 20% in a prior version, etc.).

Accordingly, if a device has one or more common files that are not in one of the plurality of common states, then the files may be corrupted or modified by malicious software. In particular, if one device has a unique copy of what should be a common system file, then either that device is the first device to apply a patch or upgrade, or the file may be corrupt or infected or otherwise identified as illegitimate. This may be used to provide zero day detection of new malicious software. In some implementations, common files need not be transferred or directly compared on a bit level; the backup system may maintain a database of checksums or signatures that the common files should match. This may allow for detection and mitigation of malicious activity on a user's device, even if files are encrypted for privacy or protection and unavailable to the backup system for library-based code scanning.

Accordingly, in a first aspect, a backup system receiving and deduplicating backup data from a plurality of computing devices may detect, based on changes in uniqueness or shared rates for files, atypical modifications to common files, and may take steps to mitigate any potential attack by maintaining versions of the common files prior to the modifications or locking backup snapshots.

In another aspect, the backup system may monitor file modification behaviors on a single device, relative to practices of an aggregated plurality of devices. For example, a backup agent on a computing device may monitor operating system or file system calls to detect modifications to files, so that the files may be transferred to or synchronized with copies stored in a backup system. Such data modifications tend to follow common patterns: individual documents (e.g. text documents, images, etc.) may be modified while users are generating or editing them; small groups of identifiable files may be modified in a short time during use of an application (e.g. a preference file, a template, a registry entry, a dictionary, etc.); and large groups of files may be modified in a short time during application installation or upgrade, operating system upgrade, etc. However, it may be atypical for user documents to be modified within seconds of an application installation, or that multiple user documents may be modified simultaneously.

Unusual file modification times and patterns may be used to detect potential malicious software, and synchronization may be locked or a backup copy of data from prior to the modifications may be duplicated or left unsynchronized to prevent the modifications from being replicated to the backup. For example, as discussed above, cryptographic "ransomware" may encrypt user documents with specified extensions (.doc, .odf, .xls, .jpg, etc.), modifying many such files in a short time period. As users neither typically open that many files at once or in such varieties, nor modify them all, such behavior may indicate the presence of the ransomware.

Accordingly, upon detection of potentially malicious modification activity, a previously backed up or synchronized store of data may be locked and/or duplicated, preventing any of the malicious modifications from being transferred to the backup system. In other implementations, a snapshot of the previous backup may be automatically created, and synchronization may continue separately without modifying the snapshot. A message may be presented to the user, informing them of the potentially malicious activity, and allowing them to restore to before the modification or indicate that the behavior was expected (e.g. intentional encryption of user files, such as running a file locker program; or deleting large numbers of temporary working files from storage).

BRIEF DESCRIPTION OF THE FIGURES

FIG. 2A is a diagram of an implementation of a backup status file;

FIG. 2B is a diagram of an implementation of a data hash table;

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

For purposes of reading the description of the various embodiments below, the following descriptions of the sections of the specification and their respective contents may be helpful:

Section A describes embodiments of systems and methods for detection of corrupt or maliciously altered common files in an online backup system;

Section B describes embodiments of systems and methods for malicious activity detection in an online backup system; and Section C describes embodiments of computing devices for practicing embodiments described herein.

Figure 1A:
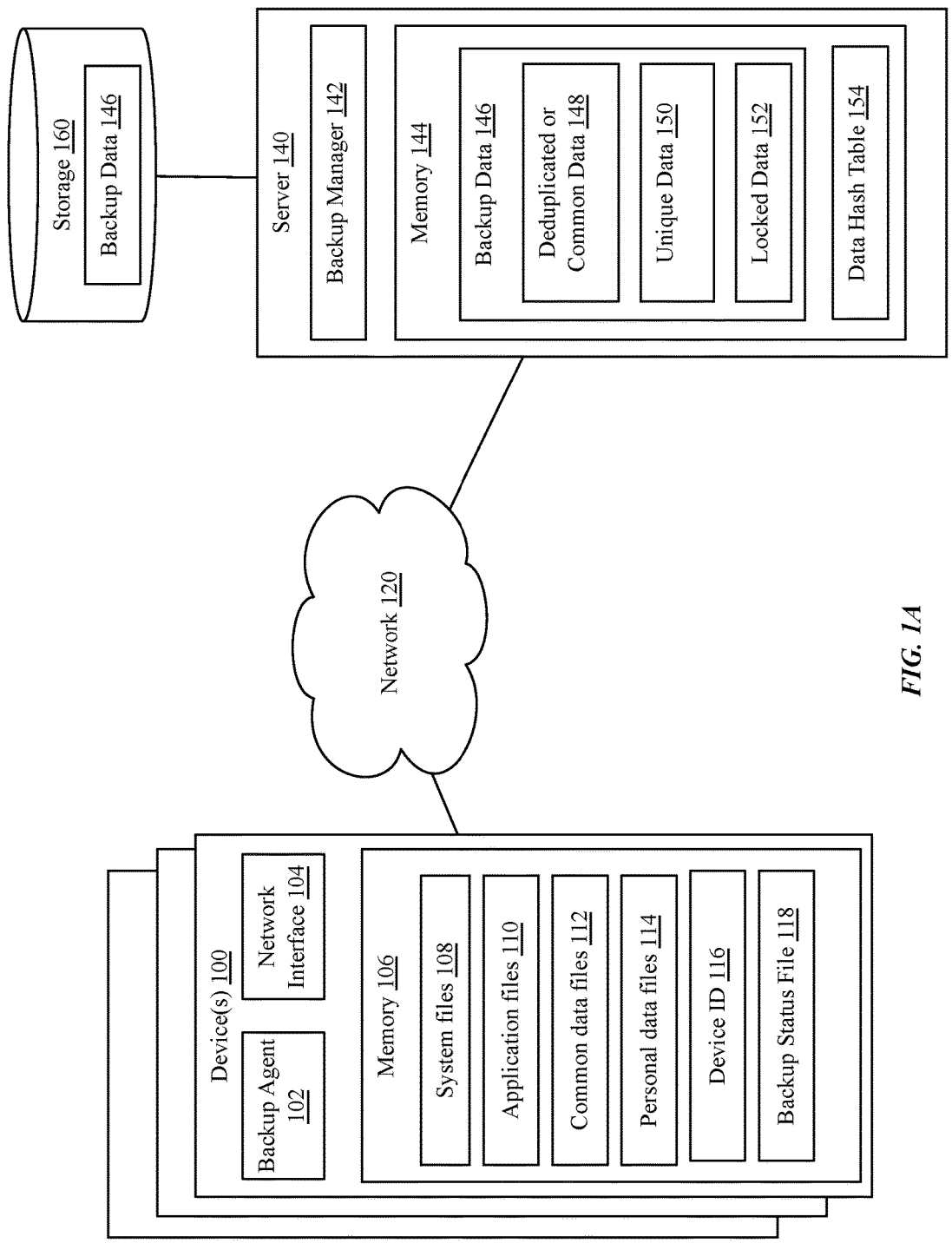
FIG. 1A is a diagram of an implementation of a system for network backup and malicious activity detection.

A. Detection of Corrupt or Maliciously Altered Common Files in an Online Backup System Network backup systems, sometimes referred to as cloud backup systems, online backup systems, or by other similar terms, may receive data for backup, archival, synchronization, sharing, and/or restoration from a large number of computing devices for remote archival and restoration. Referring first to FIG. 1A, illustrated is an embodiment of a network backup system comprising a plurality of devices 100 communicating via a network 120 to a backup server 140, which may manage one or more storage devices 160.

A device 100 may comprise any type and form of computing device, such as a desktop computer, laptop computer, tablet computer, smart phone, wearable computer, workstation, server, virtual machine executed by a physical machine, or any other type and form of computing device. In many implementations, devices 100 may be referred to as client devices, user devices, backup or synchronization clients, or by any other similar term. Devices 100 may be of different types, brands, or models, and may execute different operating systems. As discussed in more detail in connection with section C, a device 100 may comprise a processor (not illustrated), a network interface 104, memory 106 including non-volatile memory such as a hard drive, flash drive, or other sort of data storage or volatile or temporary memory such as RAM, and input/output devices such as a display, keyboard, touch screen, or other such device. The processor may execute a backup agent 102, as well as an operating system, applications, or other processes or logic.

A backup agent 102 may comprise an application, service, server, daemon, routine, subroutine, or other executable logic for monitoring a file system for new, modified, or deleted files; synchronizing or transferring new or modified files to a backup server 140 or service; for restoring archived files from the backup server; and/or for detecting malicious or suspicious file activity. In some implementations, a backup agent 102 may render a user interface or indicator to show a status of files or folders for backup, such as overlay icons or similar indicators. In many implementations, a backup agent 102 may hook or intercept operating system calls to a file system or storage system to monitor file writes. In other implementations, an operating system may provide explicit callbacks or indications of new or modified files. In some implementations, a backup agent 102 may generate a cryptographic hash of a data or executable file. In some implementations, the backup agent 102 may transmit the cryptographic hash of the data or executable file to a backup server, which may compare the hash to other received hashes to determine if the file is unique or common to a plurality of computing devices 100, or whether the file needs to be transferred for backup. The hash algorithm may be any suitable algorithm for representing data in a small format, such as the Message Digest v.5 ("MD5") algorithm, the 256-bit digest based Secure Hash Algorithm ("SHA-256"), or any other such algorithm. In other implementations, the backup agent 102 may maintain a backup status file 118, discussed in more detail below. The backup status file 118 may identify data files that have been backed up or synchronized, their hashes, and/or storage locations including storage locations in a remote server 140 or storage device 160.

In many implementations, backup agent 102 may include functions for communicating via a network interface 104 with a backup server 140 or servers. Backup agent 102 may establish connections via a suitable protocol, such as a lossless transport layer protocol such as the Transport Control Protocol (TCP), a network layer protocol such as Internet Protocol (IP), an application layer protocol such as secure file transfer protocol (SFTP), or any other type and form of protocol for data transfers between the device 100 and server 140 or storage device 160. In some implementations, the backup agent 102 may encrypt data and/or metadata of files before transmission to server 140 and/or storage 160. Encryption keys may be generated and/or stored locally on device 100, or on storage maintained by device 100 (e.g. an external flash drive, network storage location, etc.). Data may be encrypted before being sent to server 140 for privacy and protection against third party acquisition or interception. Accordingly, in many implementations, server 140 may not be able to decrypt or read backed up data.

Although primarily discussed in terms of complete files, in many implementations, backup agent 102 may fragment files for backup. This may reduce network bandwidth requirements, if only a fragment of a large file has been modified. To ensure that hashes of common fragments are identical, files may be fragmented according to predetermined rules, such as a maximum fragment size (e.g. 100 kilobytes (kb), 1 Megabyte (MB), 10 MB, etc.). Accordingly, in such implementations, each client device 100 with the same large file may fragment the file in a similar manner and generate identical hashes for each fragment.

Network interface 104 may comprise a wired interface such as an Ethernet interface of any speed including 10 or 100 Megabits via Baseband signaling over Twisted Pairs (10BASET, 100BASET), Gigabit Ethernet, or any other such speed, a universal serial bus (USB) interface, a power line interface, a serial interface, or any other type of wired interface. In other implementations, network interface 104 may comprise a wireless interface, such as a Bluetooth, Wireless USB, 802.11 (WiFi) interface, or cellular interface, or any other type and form of wireless interface. In some implementations, a network interface 104 may include both a wired and wireless interface, to provide additional flexibility, reliability, or bandwidth. Network interface 104 may include one or more layers of a network stack, including transport layer functions, Internet layer functions, physical layer functions and interfaces, or any other such functions or interfaces. Network interface 104 may communicate via a network 120 and/or one or more other networks, including a local area network (LAN) behind a gateway or network address translator (NAT) or other such device (not illustrated). Accordingly, the network interface 104 may have an IP address that is available to a wide area network (WAN, such as the Internet) or may be behind an appliance and have an IP address directly available only to the local network. Network 120 may be a LAN, a WAN, a cellular network, a terrestrial or satellite network, or any combination of these or other networks. Network interface 104 may be used by backup agent 102 to establish a connection to a server 140 or a backup manager 142 executed by a server 140 for transferring data between device 100 and server 140 or a storage device 160.

A device 100 may include a memory storage device 106, such as a hard drive, flash drive, hybrid drive, or any other type and form of data storage. Although shown external to memory 106, in some implementations, a backup agent 102 may be stored in memory 106 for execution by a processor.

Memory 106 may store different types of data, including system files 108 such as operating system executable files, libraries, a registry, user interface components, or other such data provided as part of or generated by an operating system of device 100. Memory 106 may also store one or more application files 110, such as executable applications, application specific libraries, templates, user interface components, settings or preferences files, application assets such as graphics or media, or any other type and form of application related files. Applications may include productivity or "office" applications, video games, web browsers including plug-ins or extensions, graphics or audio applications, or any other type and form of application.

Memory 106 may also store common data files 112, which may be files other than system files 108 or application files 110 that may be separately stored on a plurality of client devices 100. Common data files 112 may comprise any type and form of file accessible by or provided to a plurality of devices, such as media files such as television shows, movies, music, commonly shared photos such as amusing cats or desktop wallpaper images, or widely distributed email or attachments. Common data files 112 may also comprise locally generated files that are nonetheless identical across different devices 100, such as local cache copies of popular websites, application preference files, logs containing default data, or any other such data.

Much of this data 108-112 may be identical on many devices 100, and may be referred to as "common" or "shared" files, even if devices 100 with shared files have never communicated with each other. In some implementations, a backup system may use deduplication or single-instance storage algorithms to back up only a single copy of the common files 108-112, avoiding having to retain multiple copies of the same data and reducing storage requirements and network bandwidth usage. In one such implementation, a backup agent 102 may generate a hash of a file and transmit the hash to a backup server 140 prior to transferring the file. If the backup server 140 has not received the file hash before, the file may be transferred and stored as an original copy. If the backup server 140 has received the file hash before (e.g. from another client device), the backup server may simply record a device identifier of the client device as associated with the file hash (and corresponding original copy of the file). The backup agent may subsequently restore the file by transmitting a file restoration request including the file hash, and the backup server 140 may transmit the associated original copy. Accordingly, a large portion of files of a client device 100 may be backed up by merely sending short file hashes to the server, reducing bandwidth and processing requirements. In some implementations, a file may be identified as corresponding to a common file based on having identical file contents (or accordingly, an identical file hash), and/or based on metadata of the file, including file name, file type, file path, file creation date, file modification date, file version, or any other such information.

Memory 106 may also store personal data files 114, which may be any unique or noncommon file, such as personal photos, user data, application or system log files, non-default or modified preference files, or any other type and form of data that is not widely shared. In some implementations, personal data files 114 may be mostly unique, or shared on only a few machines. For example, a user may keep photos on a laptop computer, tablet computer, and smart phone. Although technically non-unique and subject to de-duplication when backing up these devices, the photos may be considered to be non-common, as they are not widely shared among a large plurality of devices.

Memory 106 may also store a device identifier 116, which may comprise a numeric string, alphanumeric string, media access control (MAC) address, serial number, user or account name, or any other type and form of identifier for identifying a client device 100. Device identifier 116 may be provided by backup agent 102 to a server 140 along with file hashes and/or files, and may be recorded or associated with the hashes or backed up files. During file restoration or synchronization, the backup agent 102 may provide the device identifier, and in some implementations, file hashes or identifiers, and the backup server may identify associated file hashes and restore corresponding files to the device 100. Accordingly, files may be retrieved without providing file names, directories, metadata, or other identifiable information to the backup server, increasing security and privacy.

Memory 106 may also store a backup status file 118. A backup status file 118, discussed in more detail below in connection with FIG. 2A, may comprise a data table, database, flat file, array, or any other type and form of data for storing file hashes, storage locations, file identifiers or metadata, or any other type and form of data for backup, synchronization, and/or restoration of data. Backup status file 118 may be generated and maintained by a backup agent 102, in many implementations. In some implementations, backup status file 118 may also be backed up to a server 140, which may allow bare-metal restoration capability (e.g. restoration of a system to an initialized or formatted storage drive, without first requiring installation of an operating system or other components).

Server 140, sometimes referred to as a backup server, backup service, cloud backup service, network backup service, online backup service, synchronization service, cloud storage, or by any other similar name, may comprise one or more physical computing devices, such as a server farm, and/or may comprise one or more virtual computing devices executed by one or more physical computing devices, such as a cloud of virtual machines. Although only one server 140 is illustrated, in many embodiments, a plurality of servers 140 may be deployed at various geographic locations, to reduce extended network usage and latency to client devices. Accordingly, in many implementations, a load balancer, authentication and redirection server, or any other such gateway to server 140 may be deployed between device(s) 100 and server(s) 140. As with device 100, server 140 may include one or more processors, one or more network interfaces, input/output devices, and storage devices. Data storage may be internal, such as memory 144; may be external, such as storage 160; or may be a combination of internal and external data storage. In some implementations, data may be stored in cloud storage maintained by one or more virtual machines and/or physical machines. Accordingly, storage may be dynamically scalable as necessary to accommodate client device backup and synchronization needs.

Server 140 may execute a backup manager 142. Backup manager 142 may comprise an application, server, service, daemon, routine, or other executable logic for establishing connections with one or more backup agents 102 via network 120 and for backing up, synchronizing, and/or restoring data files. In some implementations, as discussed above, backup manager 142 may perform deduplication functions or compare received file hashes to stored file hashes before receiving backup data from device(s) 100 to reduce network usage and storage needs. Backup manager 142 may maintain a data hash table 154, discussed in more detail below in connection with FIG. 2B. The data hash table 154 may comprise a data table, database, array, flat file, or any other type and form of data file and may identify stored files (which may be encrypted and unreadable by the backup manager) by file hash, and associate the file and hash with one or more device identifiers. Although shown external to memory 144 and storage 160, in some implementations, a backup manager 142 may be stored in either or both of these locations for execution by a processor of the server. Similarly, although shown internal to memory 144, in some implementations, data hash table 154 may be stored in storage 160.

Figure 1B:
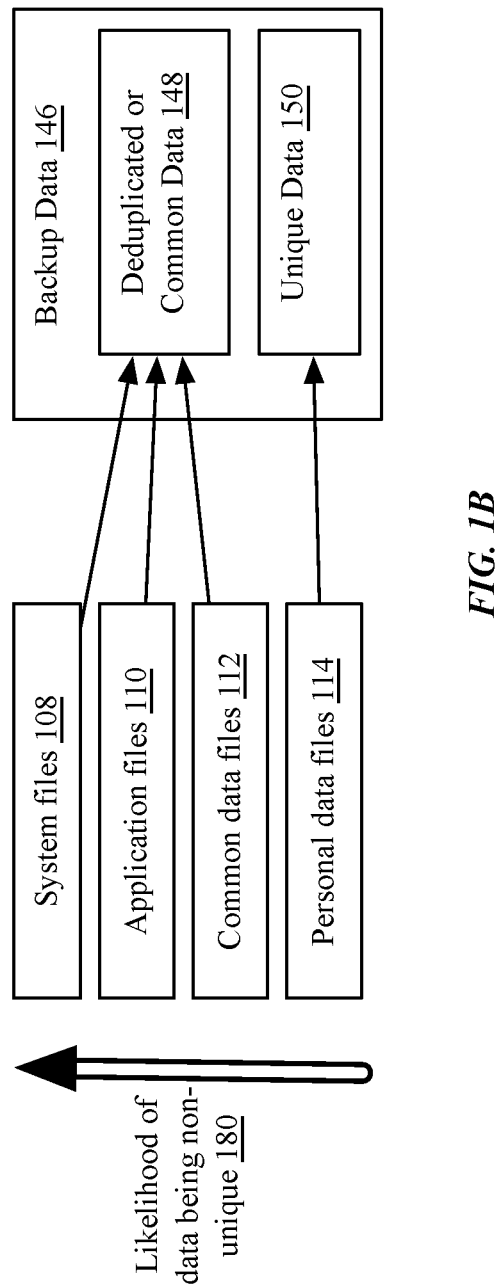
FIG. 1B is a diagram illustrating a relationship of common and unique files, according to one implementation.

As discussed above, server 140 may include internal memory 144 and/or may communicate with or maintain external memory 160, which each may comprise any type and form of memory device, similar to memory 106. Memory 144 and/or storage 160 may store backup data 146, which may comprise backed up data files and/or fragments. Referring briefly to the diagram of FIG. 1B, in many implementations, backup data 146 may include deduplicated or common data 148 such as system files 108, application files 110, and common data files 112. Backup data 146 may also include unique or relatively unique data files 150, such as personal data files 114. Data files may be associated with a shared rate (e.g. percentage of client devices including identical files or fragments) or a likelihood of data being non-unique. Although shown separate, in many implementations, the distinction between common data 148 and unique data 150 may be a logical distinction rather than a physical distinction; data files or fragments 148-150 may be similarly encrypted and stored, with the distinction being that common data is associated with a large plurality of device identifiers, while unique data is associated with just one or a small plurality of device identifiers.

In many implementations of backup systems, as files are modified by users (such as text documents or spreadsheets), the modified files or modified fragments may be backed up to the backup server. In some implementations, to further save storage and bandwidth, the modifications may be stored as a difference or delta from the prior version of the file. Differential backups may significantly reduce storage requirements, while adding time to process and rebuild the files. Accordingly, many backup systems periodically "roll up" or combine base versions and differential backups of files, allowing faster restoration, at the expense of being unable to "unroll" or reverse modifications after a certain amount of time has passed or a bandwidth or storage usage quota has been exceeded. However, if the file is corrupt or has been modified by a malicious attacker or is otherwise illegitimate, then combining base versions and differential backups may result in rolling up the corruption or modification and eliminating the ability to restore non-corrupt or legitimate versions of the file. This may be even worse with slow moving attacks on system files, such as where only a few machines are infected per day, or delayed or hidden attacks in which files are modified but no symptoms (e.g. system crashes, slowdowns, alert or ransom messages, etc.) are visible to users. As the backup system periodically combines modifications to the system files before the corruption may be detected, the corruption may be "fixed" to the file. Even if differential or incremental backups are maintained for longer periods at the expense of storage requirements, it may be difficult to determine which backup was made prior to file corruption.

Returning to FIG. 1A, to prevent corruption from affecting archived data, in some implementations, backup data 146 may also include locked data 152 or snapshots of files prior to being modified to a present version. In some implementations, data may be locked by tagging the data to not be combined or rolled up with differential backups until the lock is removed by the system or an administrator. In other implementations, a snapshot of the data prior to the suspect modification may be generated by combining a base version and any differential backups prior to and except for the most recent modification into a new base version, which may then be tagged to be not combined or rolled up until unlocked. These latter implementations may allow faster restore of non-corrupt files by pre-generated the files in a non-corrupt state from differential backups up until the corruption was detected.

In typical usage, common or shared files such as system files 108, application files 110, and common data files 112 may not be modified by users. Rather, each client device 100 may retain identical copies until system or application upgrades or patches are applied. Such upgrades may be publicized ahead of time, and/or may be applied on a large number of devices simultaneously via automatic or periodic upgrade systems. While individual devices 100 may not necessarily apply upgrades at the same time, the common files will exist on normal, uncorrupted devices in one of a plurality of common states (e.g. a latest version or build, a prior version, a version prior to that, etc.), and each state may be shared by a large plurality of devices (e.g. 60% of the devices having the application in a current version, 20% in a prior version, etc.).

Accordingly, if a device has one or more common files that are not in one of the plurality of common states, then the files may be corrupted or modified by malicious software. In particular, if one device has a unique version of an application or system file that is common to hundreds or thousands of other devices, then either that device is the first device to apply a patch or upgrade, or the file may be corrupt or infected. This may be used to provide zero-day detection of new malicious software. As discussed above, common files need not be transferred or directly compared on a bit level; instead, hash results or signatures may be compared to detect differences. This may allow for detection and mitigation of malicious activity on a user's device, even if files are encrypted for privacy or protection and unavailable to the backup system for library-based code scanning. Furthermore, in many implementations, a malicious modification to a file may attempt to "hide" by providing false modification metadata. For example, a "last modified" date or version metadata may not be updated when the file is modified, such that the modified or corrupt file may have the same metadata, version, modification date, etc. as the legitimate file, while having different file contents (and accordingly a different hash result). In one implementation, a data hash table and/or backup status file may store a plurality of hashes in explicit association, with each hash corresponding to a state of the file. For example, when a file is first stored by the backup system, it may have a first hash result. The server may store the hash result and associate the result with a plurality of client devices. When the file is modified on a client device, its backup agent 102 may generate a new hash for the file, and transmit an identification of the prior hash and new hash to the backup server. Determining that the file is a common file which is typically not modified, the backup manager may store the new hash (and a copy of the modified file) as a potential new version or potential corrupt version of the file, and may lock the prior version of the file from being overwritten or generate a snapshot, as discussed above.

Accordingly, a backup system receiving and deduplicating backup data from a plurality of computing devices may detect, based on changes in uniqueness or shared rates for files, atypical modifications to common files, and may take steps to mitigate any potential attack by maintaining versions of the common files prior to the modifications or locking backup snapshots.

Figure 1C:
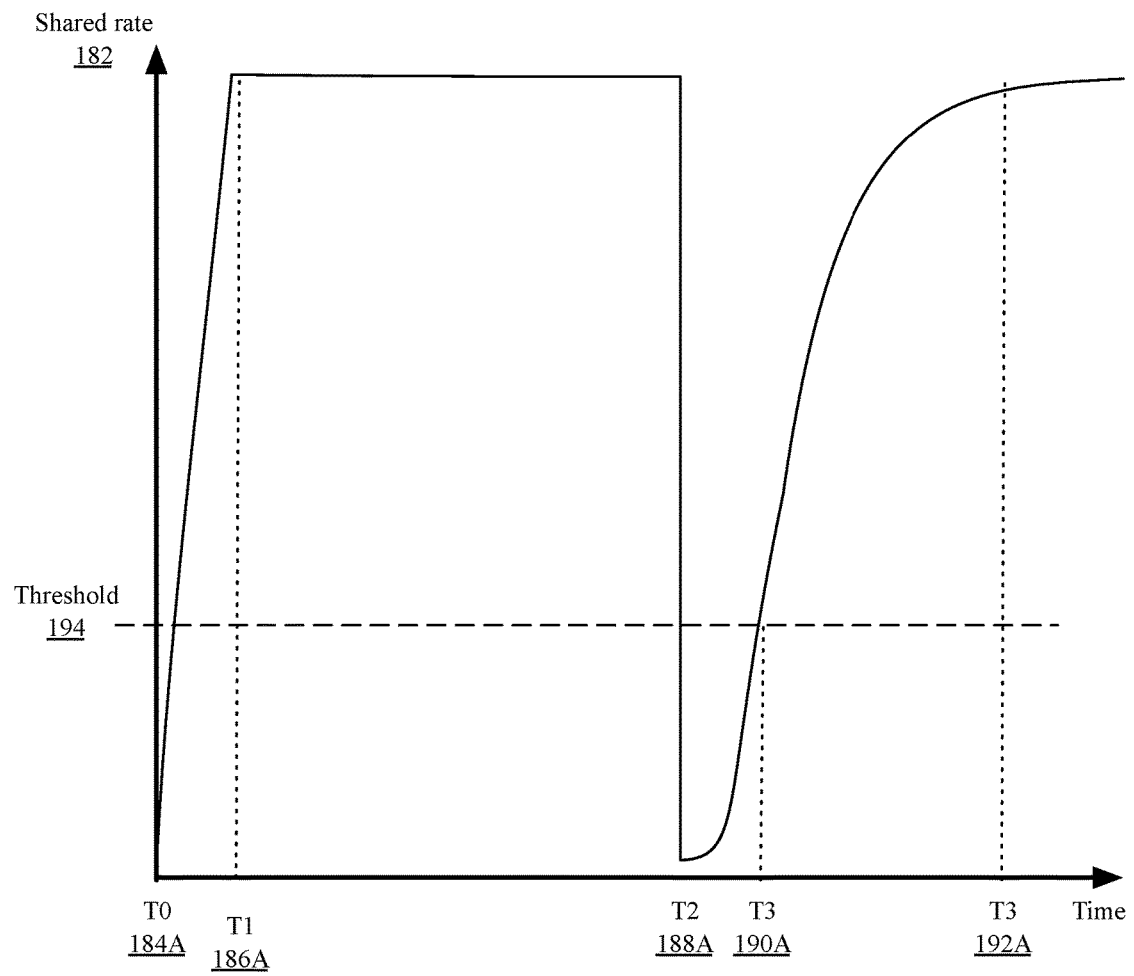
FIGS. 1C-1E are exemplary graphs of a rate of commonality of a file over time, according to one implementation.

FIG. 1C is a graph illustrating an example of a rate of commonality or shared rate 182 over time for a common file, such as a system file or application file. As shown, at an initial time T0 184A, the backup system may receive a first copy of the file from a first client device. The file may be newly created (e.g. the first installation of a brand new application or new operating system version, a newly patched system file, etc.) or the first client device with the file using the backup system may have initiated a backup for the first time. As discussed above, the file may be encrypted and transferred to the backup server for storage, along with a hash of the file for deduplication and comparison purposes.

If the file is a common file, then within a short time, other client devices will update or install the file and will attempt to backup the newly updated or created file. Accordingly, the shared rate 182 for the file will quickly rise from one client device to hundreds or thousands of client devices, exceeding a predetermined threshold 194 within a matter of hours or days. Threshold 194 may be used to determine if a file is a common file or simply a personal file shared by a household or small group, and/or whether subsequent modifications to the file are similarly common.

At some subsequent point T1 186A, the shared rate for the file will plateau as the number of client devices updating or installing the file stabilizes. In some implementations, the rate may have a sharp corner, while in other implementations, the rate of increase may decline and approach a level. The sharpness of the rise and corner may be dependent on various factors such as frequency of automatic update queries by an application or operating system, whether the install or update is mandatory (e.g. a client for an online multiplayer game that requires the latest update in order to connect), or other such factors.

At some subsequent point T2 188A, a modification may be made to the file, such as a new update or potential corruption or malicious modification. The shared rate or number of client devices having the previous version of the file will be reduced by one (a negligible change, compared to potentially thousands of devices with the file installed); while the shared rate or number of devices having the new version of the file will equal one. The backup manager may identify the change in the shared rate for the file and may flag the new modification as potentially suspect. As discussed above, in some implementations, the backup system may lock or snapshot a prior version of the file.

If the modification is legitimate, such as a new update from the application provider, then many client devices will likely perform the update within a short time, as each performs manual or automatic updating processes. Accordingly, the shared rate for the new version will rise and, at time T3 190A, will again exceed threshold 194. In some implementations, responsive to exceeding threshold 194, the system may remove any flag indicating the modification as potentially suspect, or may mark the modification as legitimate. As discussed above, the backup system may unlock the prior version of the file, or create a new base version for the file utilizing the modification. At some subsequent time T3, 192A, the shared rate for the file may again approach, equal, or even exceed the rate for the prior version.

Figure 1D:
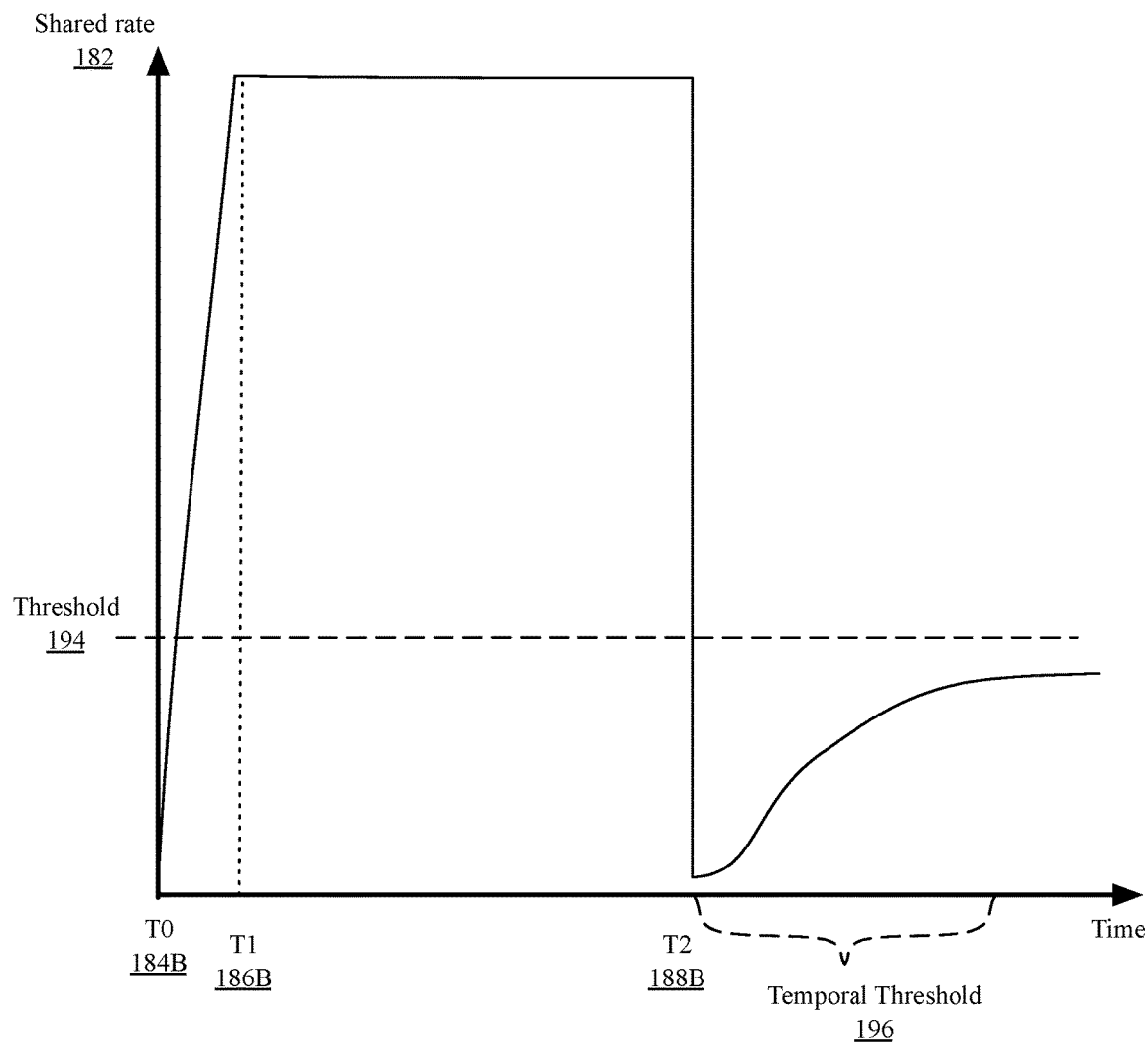

FIG. 1D is another graph illustrating an example of a rate of commonality or shared rate 182 over time for a common file. Similar to FIG. 1C, at T0 184B, a first instance of a file is stored by the backup system. The rate rises quickly as other client devices also install and back up the file, reaching a plateau at T1 186B. At T2 188B, a modification is made to the file on a client device, which provides a copy of the file and a hash of the file to the backup system. However, unlike the graph of FIG. 1C, the modification is not widely adopted. This may be the result of a modification to the file from malicious code on a website that is only visited by a subset of users or a worm or trojan application propagated by email to contacts of each user, or may reflect a difference between users who will or will not click on installation messages without reading them. While the shared rate for the modified file may rise, if it does not exceed threshold 194 within a predetermined period of time or temporal threshold 196, the system may mark the modification as likely corrupt or malicious or illegitimate. The temporal threshold may be predetermined or configured by an administrator to a set value, such as 24 hours, 72 hours, 1 week, 4 weeks, or any other such time. In other implementations, the temporal threshold may be dynamically determined, such as based off a time for a shared rate for a previous version of the file to exceed a threshold (e.g. equal to such a time, double the time, triple the time, etc.). In still other implementations, the temporal threshold may be based off the prior shared rate once it had plateaued, with a higher shared rate corresponding to a shorter temporal window. This may be done under the assumption that if a file is very common, then it may be used and/or updated more frequently than a file that is rarely accessed.

In some implementations, the system may generate and transmit a notification to client devices having the modified version installed indicating the file as likely corrupt or illegitimate, and offering to restore the prior, unmodified version of the file. In other implementations, restoration of the unmodified version of the file may be performed automatically to prevent further distribution of malicious code. In some implementations, users of the backup system may opt-in or select to allow automatic restoration.

Figure 1E:
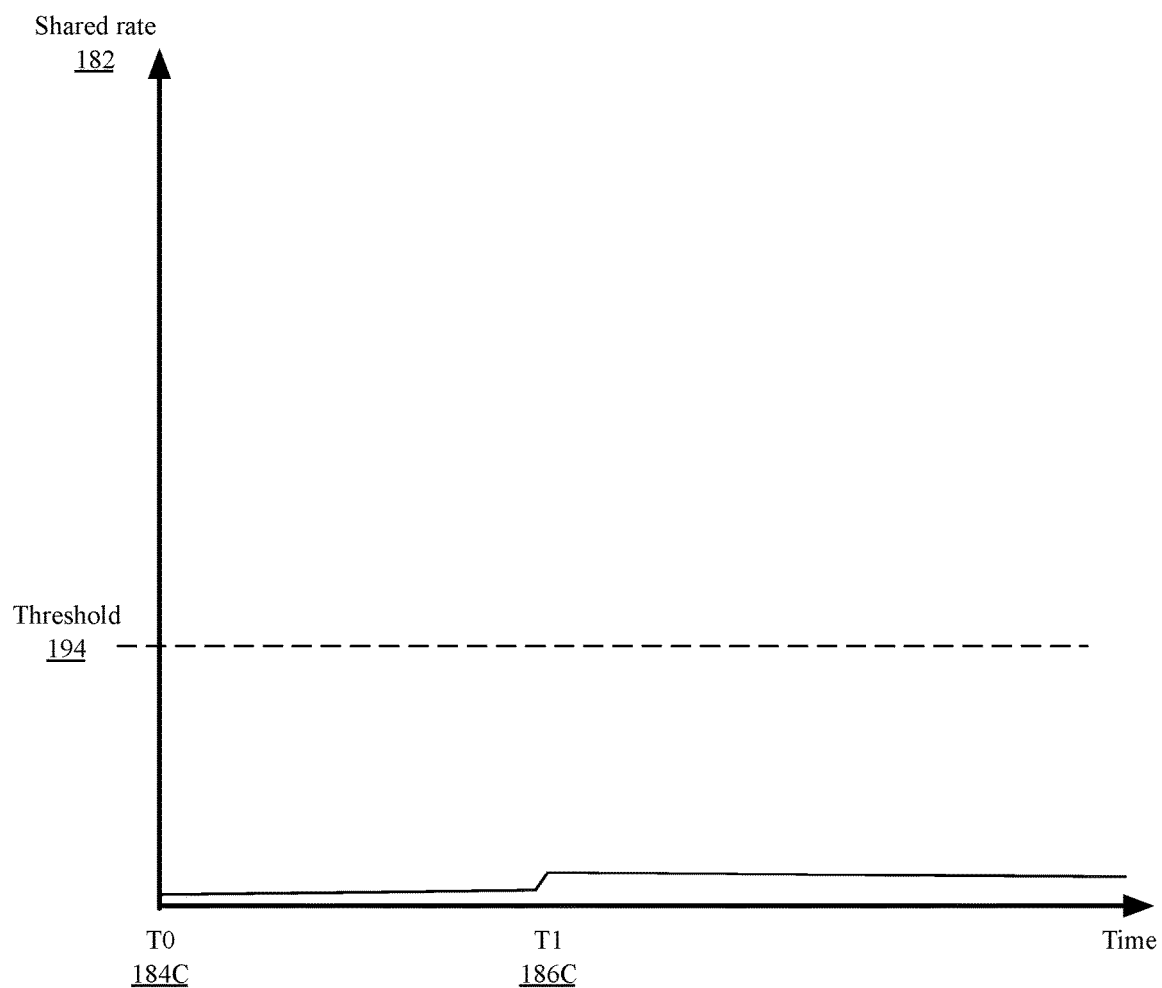

For comparison to FIGS. 1C and 1D, FIG. 1E is another graph illustrating an example of a rate of commonality or shared rate 182 over time for a unique or personal file. At T0 184C, a file may be first created or backed up by a first client device. At a subsequent time T1 186C, a second client device may also back up the file. This may be a result of the file being shared from the first device to second device via a cloud synchronization or storage service, via email among acquaintances, or any other such methods. In some instances, the file may not be explicitly shared between the first and second device, but may be independently generated by the second device and coincidentally identical, such as two players of a game who happen to save at the same point, or two users of an application who configure preferences identically. While the backup system may perform deduplication on the file to reduce bandwidth and storage requirements, because the shared rate does not exceed threshold 194, the system may not be able to detect file corruption due to a client having a non-standard version of the file. Another implementation for detecting corruption of such files is discussed below in connection with section B.

FIG. 2A is a diagram of an implementation of a backup status file 118. As discussed above, in many implementations, a backup agent on a client device may maintain a backup status file 118. The backup status file may include identifications of one or more files 202A-202N that are backed up or synchronized with a backup service. The files may be identified by name, directory, type, size, date of creation, date of last modification, frequency of usage, category, or any other type and form of identification: (although in some instances, file modification dates may be spoofed or altered by malicious activity, and accordingly, file system write events may be used to identify modifications to files). In some implementations, the backup status file 118 may also store identifications of fragments of files, as discussed above. In such implementations, each fragment may have a predetermined size or predetermined range within the file to ensure that all client devices fragmenting the file are able to generate identical hash values for each fragment. For example, in one implementation, files may be fragmented in 10 MB blocks, starting from the top of the file. If the file is 35 MB in length, this results in a first fragment from 0-10 MB, a second fragment from 10-20 MB, a third fragment from 20-30 MB, and a fourth fragment from 30-35 MB. In other implementations, the files may be fragmented in other ways, provided they are standard for each client device. For example, in one such implementation, files may be fragmented into predetermined sizes starting from the end of the file. In another implementation, files may be fragmented into equal size fragments with the number of fragments based on the file size (e.g. five 7 MB length fragments for a 35 MB file; seven 9 MB length fragments for a 63 MB file, etc.) Each client device may use the same fragmentation parameters, which may be pre-configured, or may be received by the backup agent from the backup manager.

Each file or fragment may be associated with a hash value or signature 204A-204N generated from a cryptographic hash function and stored in the status file 118 in association with the corresponding file or fragment. As discussed above, any type and form of hash algorithm may be used, including MD5, SHA-256, SHA-2, or any other such algorithm. The hash may be calculated from contents of the file and/or metadata of the file, provided the metadata used is common to all clients with the file, such as an application name or creation date.

To distinguish an encrypted modified file from an encrypted original version of the file, without requiring decryption or identifiable metadata, the backup status file 118 may store a prior hash value 204A'-204N' for any modified file. When a file is first generated or backed up, a hash 204 may be calculated and stored in the status file 118; when the file is subsequently modified, the hash 204 may be stored as a prior hash 204' and a new hash 204 generated from the modified contents. Both the new hash 204 and prior hash 204' may be transmitted to a backup service for deduplication comparison, such that the backup service is able to identify and record the device as backing up a new version of an old file, rather than an entirely new file. In other implementations, rather than maintaining or transmitting a prior hash value 204', the backup agent may transmit the new hash value 204 along with the file identifier 202. This may reduce privacy or security, as the file information may not be encrypted and/or may include identifiable information. For example, such files may be identified by file name, directory path (excluding or ignoring user-specific directory names or portions of names, such as users/[name]/library/), file type, version, description, or any other such identifiers.

In some implementations, the backup status file 118 may include a storage location 206A-206N of each file or fragment on a backup server or storage device, such as an address in memory of the storage device. This may allow the backup service to back up encrypted data in large blocks (e.g. several hundred or thousand MB) without any metadata, increasing security and storage efficiency, while still allowing backup agents to restore individual files by requesting ranges (e.g. start location and length or start and end locations) within the backup data.

As discussed above, in some implementations, the backup status file 118 may be periodically backed up to local storage media of the client device, or may be backed up to the backup system to allow bare metal restore. For example, the file may be encrypted, fragmented (if necessary), and transmitted to the backup server in the same manner as any personal data file. The file may be associated with a device identifier of the client device. For full restoration, the backup status file may be retrieved via the device identifier, and decrypted by a user entering the corresponding cryptographic key. Once decrypted, the backup agent may transmit further file requests based on the identified files, hashes, and/or locations.

FIG. 2B is a diagram of an implementation of a data hash table 152, which may be maintained by a backup manager of a backup server or a similar application or entity. Data hash table 152 may comprise a database, data table, array, flat file, or any other type and form of file. Data hash table 152 may include one or more hash calculation results 204A-204N corresponding to files or fragments. As discussed above, hashes may be generated by a backup agent on a client device prior to encryption of a file or fragment for transmission, such that the backup manager may uniquely identify the file or fragment without being able to interpret or read its contents. In some implementations, hashes 204A-204N may be associated with a storage location 206A-206N in internal or external storage of the backup server to allow retrieval upon request for the file or fragment corresponding to a hash. In other implementations, as discussed above, client devices may store locations 206A-206N of files or fragments and the server may simply store received encrypted data in large blocks, without being able to partition the blocks into files or fragments.

Data hash table 152 may include one or more device identifiers 208A-208N associated with a hash 204A-204N. A device identifier 208 may be associated with a hash 204 responsive to the corresponding device indicating that it has a file or fragment associated with the hash for backup. If the file is non-unique and a copy has previously been stored at the backup server, then in some implementations, rather than transferring the file, the backup manager may simply add the device identifier of the device to the data hash table 152 for the corresponding hash 204. In some implementations, the backup manager may transmit an identification of a storage location of the corresponding already-stored file to the device for storage in a backup status file.

In some implementations, data hash table 152 may include storage locations 206A-206N of fragments or files corresponding to hash values 204A-204N. As discussed above, the locations may be provided to client devices to allow the devices to request files or fragments directly. In other implementations, storage locations may be retained by the backup server, and clients may request restoration or recovery of files or fragments by hash value. As discussed above, the storage locations may be identified by starting and ending memory addresses, starting memory address and length, or any other such method.

Data hash table 152 may include one or more device identifiers 208A-208N associated with each hash value 204A-204N, and identifying a client device that had a copy of the corresponding file or fragment as of a last backup time. Device identifiers 208 may be added to the hash table by a backup manager upon receipt of a hash value from a client device and identification of the hash value as a preexisting entry in the data table 204. Device identifiers 208 may also be removed from the hash table, responsive to a backup agent transmitting a notification to the backup manager indicating that a file has been deleted from the client device. As discussed above, each hash result 204 may be associated with one or more device identifiers 208. A unique file may be associated with only a single device identifier, or may be relatively unique and shared among a small number of devices (e.g. a laptop, tablet, and smartphone; laptops of two family members; a group of work colleagues, etc.). A common file may be associated with many more devices, such as hundreds of thousands of devices or more. In some implementations, the number of associated devices for each hash result 204A-204N may be recorded as a corresponding shared rate 210A-210N. The shared rate may be a number of devices, a percentage of users of the backup system, or any other indicator of the commonality of a file (e.g. a normalized value between 0 and 1; an indicator of low, medium or high; etc.).

As discussed above, in some implementations, a data hash table 152 may store a prior hash value 204A'-204N' associated with a corresponding present hash value 204A-204N. In one implementation, when a file is first modified or updated at a client device, the backup agent may generate a new hash value for the modified file 204 and may transmit it, along with the prior hash value 204', to the backup server. Because the new value 204 does not exist in the data table 152, the backup manager may add a new entry comprising the hash value, prior hash value, the device identifier, and/or the storage location of the modified file. In other implementations, the backup agent may initially transmit just the new hash value for the modified value. Upon determining the value is not present in the hash table, the backup manager may request the backup agent to transfer the corresponding file for archival. The backup agent may transmit the file along with the prior hash value to identify the file as a new version of a previously archived file, rather than a unique file.

In some implementations, the data hash table may include a timestamp indicating when an entry was first created in the hash data table, identifying when the first such hash result was received. This timestamp may be used to determine an age of the modified file for comparison to a temporal threshold, as discussed above.

Figure 3A:
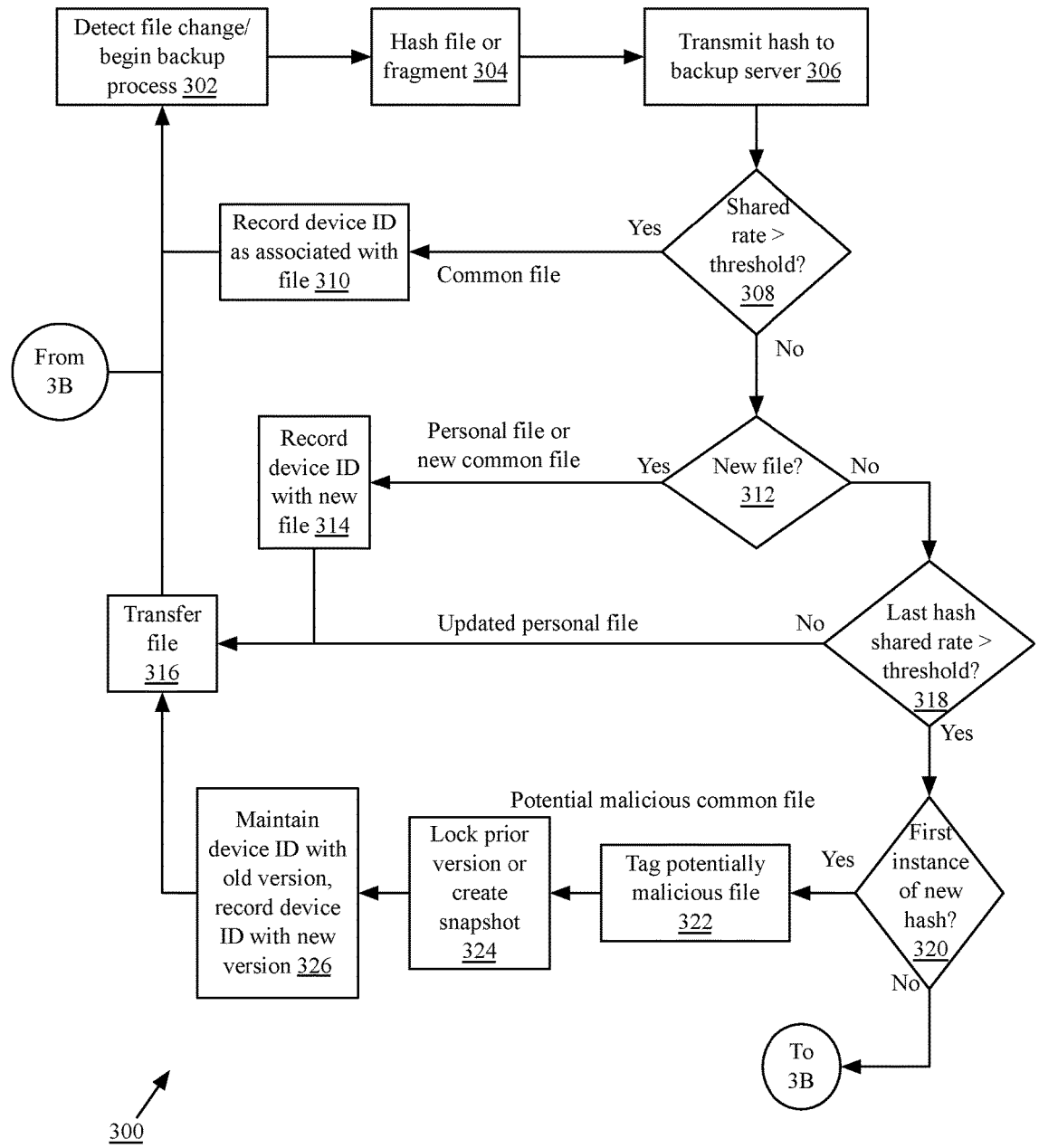
FIGS. 3A and 3B are flow charts of an implementation of a method for detection of malicious or corrupt files.
Figure 3B:
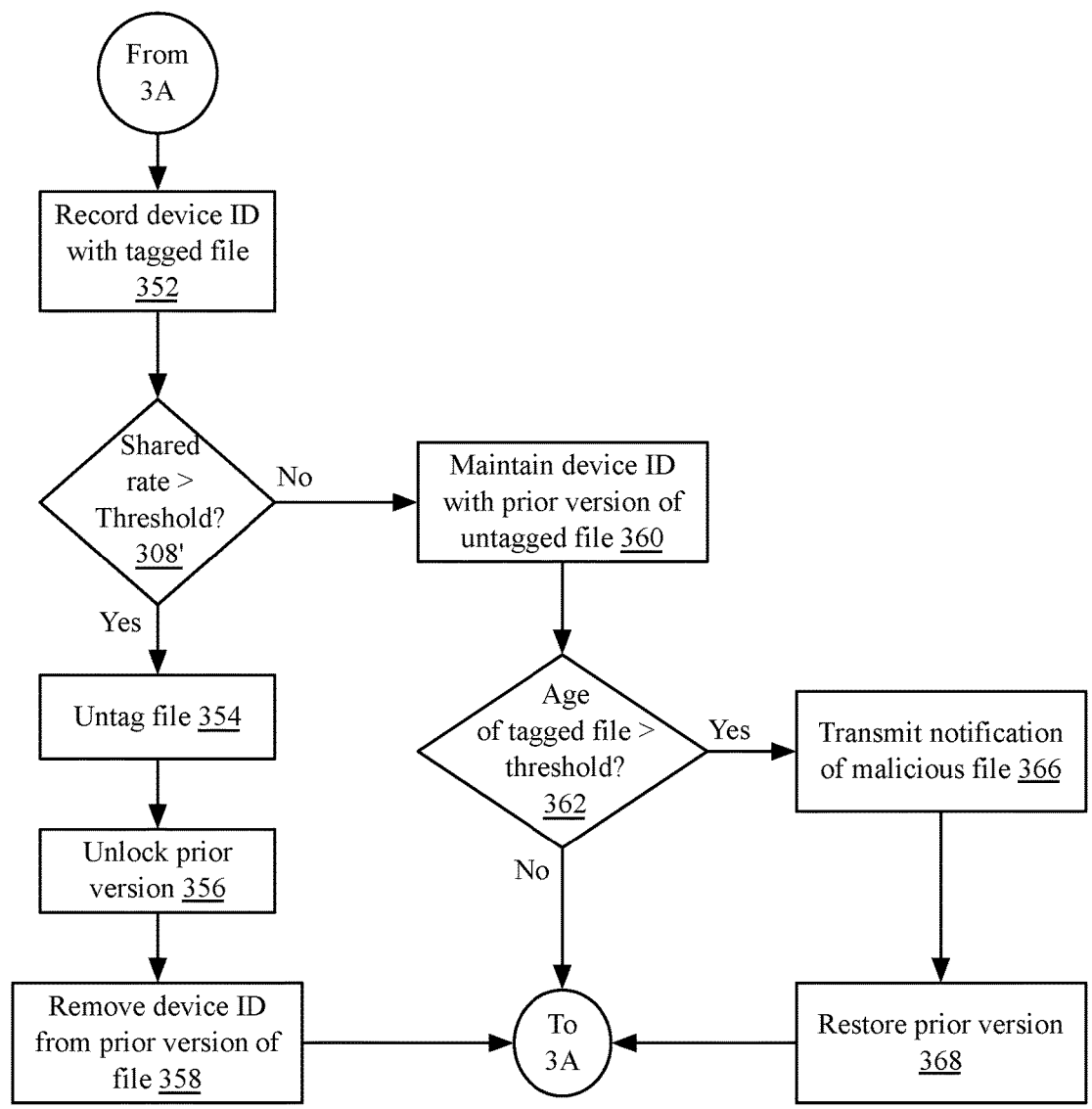

FIGS. 3A and 3B are flow charts of an implementation of a method 300, 350 for detection of malicious or corrupt files. In brief overview, at step 302, a backup agent may detect a file change or creation and/or begin an initial or periodic backup process. At step 304, the backup agent may calculate a hash of a file or fragment to be backed up. At step 306, the hash value may be transmitted to a backup manager of a backup server. At step 308, the backup manager may determine if the shared rate for the file or fragment corresponding to the hash value is above a threshold. If so, the file or fragment may be designated as a common file, and at step 310, the device identifier of the client device may be recorded in a hash data table as associated with the hash value, the file or fragment, and/or a storage location of the file, as discussed above. If the shared rate for the file or fragment is not above a threshold, then at step 312, in some implementations, the backup manager may determine if the file or fragment is new. If so, then the file or fragment may be a new personal file or common file, and at step 314, the device identifier may be recorded in the hash data table as associated with the hash value of the new file or fragment.

At step 316, the file or fragment may be transferred from the client device for archival. In other implementations, step 316 may be performed before step 312 and 314.

If the file is not a new file, then at step 318, the backup manager may determine if the shared rate for a prior hash value of the file, before modification, is above a threshold. If not, then the file may be an updated personal file, and at step 316, the file may be transferred to the backup server for archival. Step 316 may occur before step 318, in some implementations.

If the shared rate for a prior hash value of the file or fragment is above the threshold, then the file may be a modified common file, and at step 320, the backup manager may determine if the hash value for the file received at step 306 is the first instance of a new hash value for the file or fragment. If so, then the modified file may be the first instance of a legitimate update to the file, or the modified file may be a corrupt or maliciously modified file. At step 322, the backup manager may tag or identify the file or fragment as potentially malicious. At step 324, the backup manager may lock the prior version of the file or fragment from being overwritten, or may generate a snapshot of the prior version of the file or fragment. At step 326, the backup manager may record a device identifier of the client device in a hash data table with the new hash value, while maintaining the device identifier of the client device with the prior hash value for the file or fragment. At step 316, the file or fragment may be transmitted to the backup server for archival. Although primarily discussed in terms of a backup agent, in some implementations, the steps of method 300 may be performed by a backup manager on a backup server. Modified or updated files may be transferred to the backup server and identified by the backup manager as potentially malicious. Such files may be tagged and separately stored, as discussed above.

Turning briefly to the method 350 of FIG. 3B, if the hash value is not the first instance of a new hash at step 320, then at step 352, the backup manager may record the device identifier of the client device as associated with the hash value of the modified file or fragment. At step 308', similar to step 308, the backup server may determine if the shared rate for the modified file or fragment exceeds a predetermined threshold. If so, then the modification was likely a legitimate update to the file. Accordingly, at step 354, the hash result may be untagged or unflagged as potentially suspect. At step 356, the prior version of the file may be unlocked or a flag removed to allow overwriting of the prior version or consolidating of the prior version in a snapshot. At step 358, the backup manager may remove the device identifier of the client device from an entry in the data hash table associated with the prior version of the file, or otherwise update the entry to indicate that it is obsolete. Accordingly, the file may be updated and once a large number of client devices have similarly updated to the new version, the new version may be accepted as legitimate.

If the shared rate for the new version of the file or fragment does not exceed the threshold at step 308', then at step 360, the backup manager may maintain the device identifier with the prior version of the file or fragment. At step 362, the backup manager may determine if an age of the new version of the file exceeds a temporal threshold. If not, the system may wait and repeat method 300, 350 for additional client devices. If the age of the new version exceeds the temporal threshold before the shared rate for the new version exceeds threshold 308', then at step 366, the backup manager may transmit a notification of a potentially malicious or corrupt file to client devices having device identifiers associated with the new version of the file. At step 368, in some implementations, the backup manager may automatically restore the prior version of the file or fragment, undoing the modification.

Returning to FIG. 3A and in more detail, at step 302, a backup agent may detect a file change or creation and/or begin an initial or periodic backup process. In some implementations, a backup agent may monitor file system read/write operations. In other implementations, a backup agent may receive a callback from an operating system and/or application responsive to modification or creation of a file. In still other implementations, a backup agent may perform periodic scans for new or modified files since a previous scan. In many implementations, the backup agent may detect file creation or modification anywhere in storage of the client device, including within system files, libraries, registry files, log files, preference files, plug-ins, extensions, applications, data files, or any other type and form of file or data.

At step 304, the backup agent may calculate a hash of a newly created or modified file or fragment to be backed up. In many implementations, large files may be fragmented into smaller size portions according to a predetermined fragmentation scheme. In such cases, the fragments may be compared to prior states to determine if a modification or change to a file occurs within a specific fragment. That fragment may be backed up, without requiring the entire file to be backed up again. The backup agent may calculate a hash of the file or fragment using any type and form of hash algorithm, including SHA-3, SHA-256, MD5, or any other type and form of algorithm. The hash may utilize the header of the file, data within the file, or a combination of the header and data and/or any other data associated with the file (e.g. checksums, file type, file creation date, version numbers, file names, etc.).

At step 306, the hash value may be transmitted to a backup manager of a backup server. In some implementations, transmitting the hash value to the backup manager may comprise establishing a connection with the backup manager via a network interface of the client device. The connection may be of any suitable protocol for transferring short strings of data (e.g. hash values, device identifiers) and/or large amounts of encrypted data, including application layer protocols such as FTP, SFTP, HTTP, SSH, and transport and network protocols such as TCP/IP, TCP/IPv6, UDP/IP, or any other type and form of protocol. Establishing the connection with the backup manager may include performing a handshaking procedure, performing an authentication or login procedure, acquiring a cryptographic certificate or token, or any other similar steps. Once a connection is established, a backup request may be transmitted to the backup server comprising the hash value of the file or fragment and, in some implementations, the device identifier of the client device, metadata of the file, or any other such information.

At step 308, the backup manager may determine if the shared rate for the file or fragment corresponding to the hash value is above a threshold. In some implementations, a backup manager may maintain a hash data table comprising an index of hash values and corresponding device identifiers. In some implementations, the data table may further comprise a count of device identifiers, a percentage of clients represented by the associated device identifiers, or a similar metric representative of the shared rate for the file or fragment. In instances in which the file is newly created and/or has not been backed up yet, the data table may not include the hash value, and may be considered to have a sharing rate of one device, or a potentially unique file. Conversely, if the file or fragment has been backed up by one or more other devices, then the hash table may include device identifiers and/or a sharing rate for the file or fragment. The backup manager may compare the sharing rate to a predetermined threshold to determine if the file is a widely shared or common file, unlikely to be unilaterally modified by any user, such as system files or application files. The threshold may be set to any appropriate level, such as 100 client devices, 500 client devices, 5000 client devices, 10% or 20% of client devices of the backup system, or any other such value.

If the shared rate exceeds the threshold, then the backup manager may determine that the client device is backing up a common file. Accordingly, at step 310, the device identifier of the client device may be recorded in a hash data table as associated with the hash value, the file or fragment, and/or a storage location of the file, as discussed above. The file or fragment need not be transmitted to the backup server, as a copy of the file already exists in storage. The backup manager may transmit a notification to the backup agent that the file has already been backed up, and may include with the notification a storage location of the file or fragment.

If the shared rate for the file or fragment is not above a threshold, then at step 312, in some implementations, the backup manager may determine if the file or fragment is new. As noted above, in some implementations, the backup manager may determine that the file is new as part of step 308, if no corresponding entry for the hash value is found in a hash data table. Thus, in some implementations, step 312 may be performed simultaneously to or before step 308. If the file is new, then the file or fragment may be a personal file or a new common file not yet backed up by the backup system (e.g. a new application, or new media file). Accordingly, at step 314, a new entry may be created in the hash data table for the hash value, and the device identifier of the client device may be recorded in the hash data table as associated with the hash value of the new file or fragment.

At step 316, the file or fragment may be transferred from the client device for archival. Transferring the file or fragment may comprise encrypting the file or fragment, compressing the file or fragment, and/or transmitting the file or fragment via the established network connection or a second network connection. In one such implementation, the backup manager may direct the backup agent to establish a second connection to a second backup server or storage server for storing the file. In some implementations, step 316 may be performed before step 312 and/or 314.

If the file is not a new file, then at step 318, the backup manager may determine if the shared rate for a prior hash value of the file, before modification, is above a threshold. In one such implementation, the backup manager may receive from the backup agent the hash result for the new or modified file or fragment, as well as a prior hash result for the file or fragment before modification. The backup manager may retrieve a shared rate from an entry in a hash data table corresponding to the prior hash result and compare the received shared rate to a predetermined threshold, as discussed above.

If the shared rate for the prior version of the file is not above the threshold, then the file may be an updated personal file or other non-common file. Accordingly, at step 316, the file may be transferred to the backup server for archival as discussed above. Step 316 may occur before step 318, in some implementations. In some implementations of step 316, the backup agent may determine a difference between a prior version of the file or fragment and the modified version, and may transmit an identification of the differences. This may require significantly less bandwidth and storage space than a complete copy of the modified version of the file.

If the shared rate for a prior hash value of the file or fragment is above the threshold, then the file may be a modified common file. At step 320, the backup manager may determine if the hash value for the file received at step 306 is the first instance of a new hash value for the file or fragment. In some implementations, the backup manager may determine if the hash value for the file is the first instance by searching the hash data table for a hash value corresponding to the received hash value. If there are no matches, then the hash value is the first received instance of the new hash, and accordingly, the modified file may be the first instance of a legitimate update to the file, or the modified file may be a corrupt or maliciously modified file, and malicious file detection and mitigation steps should be performed. At step 322, the backup manager may tag or identify the file or fragment as potentially malicious. Tagging the file may comprise adding a flag or predetermined string to the hash data table to identify the entry as potentially malicious or corrupt or illegitimate, in some implementations. In other implementations, the backup manager may tag the file or fragment by designating a predetermined storage location for potentially suspect files (e.g. a sandboxed storage device). At step 324, the backup manager may lock the prior version of the file or fragment from being overwritten, or may generate a snapshot of the prior version of the file or fragment. In some implementations, locking the prior version of the file or fragment may comprise adding a flag or predetermined string to an entry in the hash data table for the hash value corresponding to the prior version of the file, or otherwise annotating or marking the file as not to be overwritten with the new, modified version of the file. In other implementations, a snapshot of the file or fragment may be created as of the prior version of the file by consolidating any base or complete files or fragments and applying differences identified in subsequent differential files or fragments until reaching the prior version of the file. This combines differential backup files to generate a single file or fragment at the last known legitimate state. At step 326, in some implementations, the backup manager may record a device identifier of the client device in an entry in the hash data table associated with the new hash value, while maintaining the device identifier of the client device with the prior hash value for the file or fragment. In some implementations, maintaining the device identifier of the client device with the prior hash value may comprise flagging the device identifier as having a modified copy of the file or fragment newer than the associated file or fragment. The association between the device identifier and the prior version of the file or fragment may be maintained to allow the backup agent to request the prior version of the file or fragment for restoration and replacement of the newer, corrupt version. At step 316, the file or fragment may be transmitted to the backup server for archival, as discussed above. The file or fragment may be complete or a differential file or fragment.

Turning to FIG. 3B, if the hash value is not the first instance of a new hash at step 320, then at step 352, the backup manager may record the device identifier of the client device as associated with the hash value of the modified file or fragment. Recording the device identifier may comprise updating a shared rate calculation associated with the file or fragment. At step 308', similar to step 308, the backup server may determine if the shared rate for the modified file or fragment exceeds a predetermined threshold. As discussed above, if the modification is legitimate, the shared rate will likely increase quickly over time and pass the threshold. If the modification is not legitimate, the shared rate will likely increase slowly as the worm or trojan spreads. The latter rate will be slower than rates of adoption of updates, due to savvy users' resistance to suspect installation dialogs or slow attack vectors such as via email or social network address books and messaging or code downloaded from a malicious website.

If the shared rate exceeds the threshold due to the addition of the device identifier at step 352, then the modification was likely a legitimate update to the file. Accordingly, at step 354, the hash result may be untagged or unflagged as potentially suspect, either by removing a flag or predetermined string, or modifying the flag or predetermined string to indicate that the file is believed to be legitimate. At step 356, the prior version of the file may be unlocked or a flag removed to allow overwriting of the prior version or consolidating of the prior version in a snapshot. In some implementations, the backup manager may consolidate the prior snapshot or versions with the new version, creating a new up to date and complete file for easier access by client devices. At step 358, the backup manager may remove the device identifier of the client device from an entry in the data hash table associated with the prior version of the file, or otherwise update the entry to indicate that it is obsolete. Accordingly, the file may be updated and once a large number of client devices have similarly updated to the new version, the new version may be accepted as legitimate.

If the shared rate for the new version of the file or fragment does not exceed the threshold at step 308', then at step 360, the backup manager may maintain the device identifier with the prior version of the file or fragment. In some implementations, as discussed above, maintaining the device identifier may comprise flagging the device identifier entry in the data hash table associated with the prior version of the file or fragment as not current or otherwise identifying that the client device has a newer version of the file.

At step 362, in some implementations, the backup manager may determine if an age of the new version of the file exceeds a temporal threshold. In some implementations, the backup manager may record a timestamp identifying when an entry is created in the hash data table, indicating when the first such hash result was received. At step 362, the backup manager may compare a difference between a current time and the recorded time stamp to identify an age of the modified file, and may compare the age to a temporal threshold. The threshold may be predetermined or configured by an administrator to a set value, such as 24 hours, 72 hours, 1 week, 4 weeks, or any other such time. In other implementations, the temporal threshold may be dynamically determined, such as based off a time for a shared rate for a previous version of the file to exceed a threshold (e.g. equal to such a time, double the time, triple the time, etc.). In still other implementations, the temporal threshold may be based off the prior shared rate once it had plateaued, with a higher shared rate corresponding to a shorter temporal window. This may be done under the assumption that if a file is very common, then it may be used and/or updated more frequently than a file that is rarely accessed.

If the age of the file has not exceeded the temporal threshold, then the system may wait and repeat method 300, 350 for additional client devices, to gather more information as to whether the file is corrupt. In some implementations, the backup manager may send a notification to client devices having device identifiers associated with the new version of the file that the file is potentially corrupt. The notification may include additional information, such as when the file was first modified, what percentage of other systems have the modified version of the file, what percentage of other systems have the non-modified or prior version of the file, how close the file is to reaching a threshold or temporal threshold and being identified as legitimate or malicious, etc. The notification may be provided or displayed for a user of the client device by the backup agent, and the user may select to restore the prior version of the file and replace the modified version of the file. This may increase the speed at which corrupt files are detected and corrected, at the expense of some accuracy or the potential for false positives.

If the age of the new version exceeds the temporal threshold before the shared rate for the new version exceeds threshold 308', then at step 366, the backup manager may transmit a notification of a potentially malicious or corrupt file to client devices having device identifiers associated with the new version of the file, as discussed above, allowing users to select to restore the prior version of the file. In some implementations, users may opt-in or select to allow automatic mitigation of corrupt files. In such implementations, at step 368, the backup manager may automatically restore the prior version of the file or fragment, undoing the modification.

Accordingly, the above systems and methods allow a backup system to utilize data regarding common or non-unique files from a large number of backup client devices to efficiently identify suspect modifications to files that are not typically modified, and take steps to contain and mitigate the corruption before becoming widespread. This may be done even for encrypted data that the backup system cannot read, and does not require scanning of executable code or maintaining a current library of virus signatures that is nonetheless vulnerable to previously unknown or zero-day exploits.

In one aspect, the present disclosure describes a method for detection of corruption of common files by an online backup system. The method includes receiving, by a backup manager executed by a first device from a second device, an identification of a file to be backed up. The method also includes identifying, by the backup manager from a backup data table, that a plurality of other devices have backed up the file. The method further includes determining, by the backup manager, that the file of the second device is different than the file backed up by the plurality of other devices. The method also includes flagging, by the backup manager, the file of the second device as illegitimate, responsive to the determination.

In some implementations, the method includes receiving a first result of a hash calculation on the file of the second device; comparing, by the backup manager, the first result of the hash calculation on the file of the second device to a second result of a hash calculation on the file backed up by the plurality of other devices; and determining that the file of the second device is different than the file backed up by the plurality of other devices, responsive to the first result not matching the second result. In a further implementation, the method includes receiving, from the second device, the second result of the hash calculation identified as performed on a prior version of the file. In a still further implementation, the method includes retrieving a backup record associated with the second result of the hash calculation, the backup record comprising device identifiers of each of the plurality of other devices, each device identifier added to the record responsive to the corresponding other device transmitting a request to back up the file.

In some implementations, the method includes identifying that a number of other devices exceeding a first threshold have backed up the file. In other implementations, the method includes retrieving a backup record associated with the file, the backup record comprising device identifiers of each of the plurality of other devices, each device identifier added to the record responsive to the corresponding other device transmitting a request to back up the file. In still other implementations, the method includes preventing modification or deletion of the file backed up by the plurality of other devices.

In some implementations, the method includes receiving, by the backup manager, from a third device, an identification of the file for backup; determining that the file of the third device is identical to the file of the second device; and increasing a shared rate for the file of the second device, responsive to the determination. In a further implementation, the method includes determining that the shared rate for the file of the second device exceeds a first threshold, responsive to increasing the shared rate for the file; and removing the flag from the file of the second device, responsive to the determination. In another further implementation, the method includes determining that the shared rate for the file of the second device does not exceed a first threshold; determining that an age of the file of the second device exceeds a second threshold, responsive to the determination that the shared rate for the file of the second device does not exceed the first threshold; and transmitting, by the backup manager to each of the second device and third device, a notification that the file of the second device is illegitimate.

In another aspect, the present disclosure is directed to a system for detection of corruption of common files by an online backup system. The system includes a first device comprising a processor executing a backup manager in communication with a second device and a plurality of other devices, and a storage device storing files received from the plurality of devices. The backup manager is configured for receiving, from the second device, an identification of a file to be backed up. The backup manager is also configured for identifying, from a backup data table, that the plurality of other devices have backed up the file. The backup manager is further configured for determining that the file of the second device is different than the file backed up by the plurality of other devices, and flagging the file of the second device as illegitimate, responsive to the determination.

In some implementations, the backup manager is further configured for receiving a first result of a hash calculation on the file of the second device; comparing the first result of the hash calculation on the file of the second device to a second result of a hash calculation on the file backed up by the plurality of other devices; and determining that the file of the second device is different than the file backed up by the plurality of other devices, responsive to the first result not matching the second result. In a further implementation, the backup manager is further configured for receiving, from the second device, the second result of the hash calculation identified as performed on a prior version of the file. In a still further implementation, the backup manager is further configured for retrieving a backup record associated with the second result of the hash calculation, the backup record comprising device identifiers of each of the plurality of other devices, each device identifier added to the record responsive to the corresponding other device transmitting a request to back up the file.

In some implementations, the backup manager is further configured for preventing modification or deletion of the file backed up by the plurality of other devices. In other implementations, the backup manager is further configured for receiving, by the backup manager, from a third device, an identification of the file for backup; determining that the file of the third device is identical to the file of the second device; and increasing a shared rate for the file of the second device, responsive to the determination. In a further implementation, the backup manager is further configured for determining that the shared rate for the file of the second device exceeds a first threshold, responsive to increasing the shared rate for the file; and removing the flag from the file of the second device, responsive to the determination. In another further implementation, the backup manager is further configured for determining that the shared rate for the file of the second device does not exceed a first threshold; determining that an age of the file of the second device exceeds a second threshold, responsive to the determination that the shared rate for the file of the second device does not exceed the first threshold; and transmitting, by the backup manager to each of the second device and third device, a notification that the file of the second device is illegitimate.

In still another aspect, the present disclosure is directed to a method for detection of corruption of common files by an online backup system. The method includes detecting, by a backup agent executed by a client device, a modification to a file from a first version to a second version. The method also includes calculating, by the backup agent, a hash result of the second version of the file. The method further includes transmitting, by the backup agent to a backup server, a request to backup the second version of the file, the request comprising the hash result of the second version of the file and a previously calculated hash result of the first version of the file. The method also includes receiving, by the backup agent from the backup server, a notification that the second version of the file is illegitimate, responsive to the backup server determining that a first plurality of other client devices exceeding a threshold have a copy of the first version of the file, and determining that less than a second plurality of other client devices exceeding the threshold have a copy of the second version of the file. In a further implementation, the method includes transmitting a request to restore the first version of the file, by the backup agent to the backup server, responsive to receipt of the notification.

B. Malicious Activity Detection in an Online Backup System

In another aspect, the backup system may monitor file modification behaviors on a single backup client device, relative to practices of an aggregated plurality of client devices. For example, a backup agent on a computing device may monitor operating system or file system calls to detect modifications to files, so that the files may be transferred to or synchronized with copies stored in a backup system. Such data modifications tend to follow common patterns: individual documents (e.g. text documents, images, etc.) may be modified while users are generating or editing them; small groups of identifiable files may be modified in a short time during use of an application (e.g. a preference file, a template, a registry entry, a dictionary, etc.); and large groups of files may be modified in a short time during application installation or upgrade, operating system upgrade, etc. However, it may be atypical for user documents to be modified within seconds of an application installation, or that multiple user documents may be modified simultaneously.

Unusual file modification times and patterns may be used to detect potential malicious software, and synchronization may be locked or a backup copy of data from prior to the modifications may be duplicated or left unsynchronized to prevent the modifications from being replicated to the backup. For example, as discussed above, cryptographic "ransomware" may encrypt user documents with specified extensions (.doc, .odf, .xls, .jpg, etc.), modifying many such files in a short time period. As users neither typically open that many files at once or in such varieties, nor modify them all, such behavior may indicate the presence of the ransomware.

Accordingly, upon detection of potentially malicious modification activity, a previously backed up or synchronized store of data may be locked and/or duplicated, preventing any of the malicious modifications from being transferred to the backup system. In other implementations, a snapshot of the previous backup may be automatically created, and synchronization may continue separately without modifying the snapshot. A message may be presented to the user, informing them of the potentially malicious activity, and allowing them to restore to before the modification or indicate that the behavior was expected (e.g. intentional encryption of user files, such as running a file locker program; or deleting large numbers of temporary working files from storage).

Figure 4A:
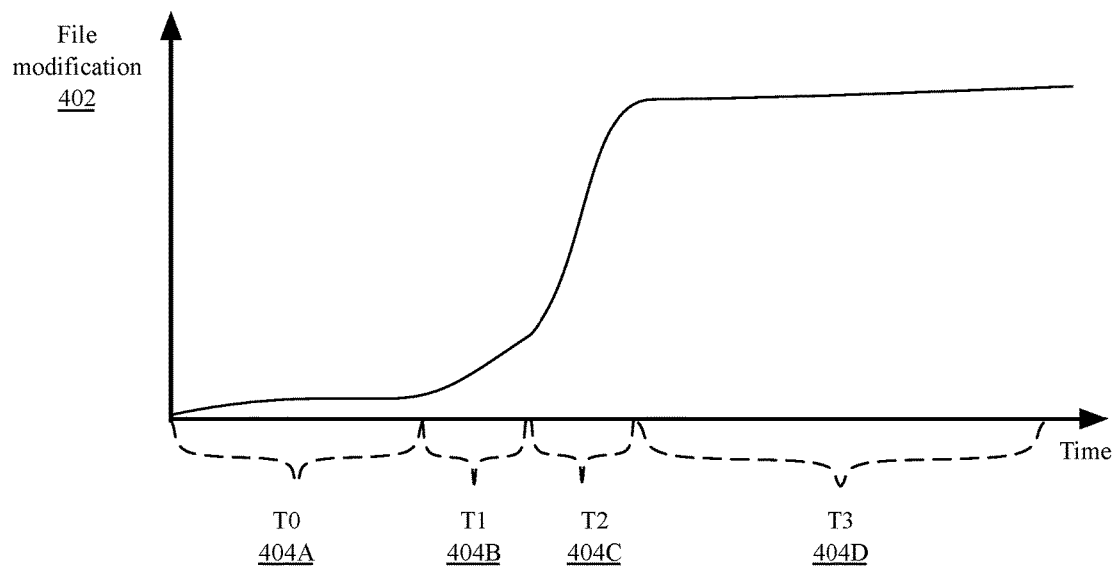
FIGS. 4A and 4B are exemplary graphs of file modifications and a modification rate over time, according to one implementation.
Figure 4B:
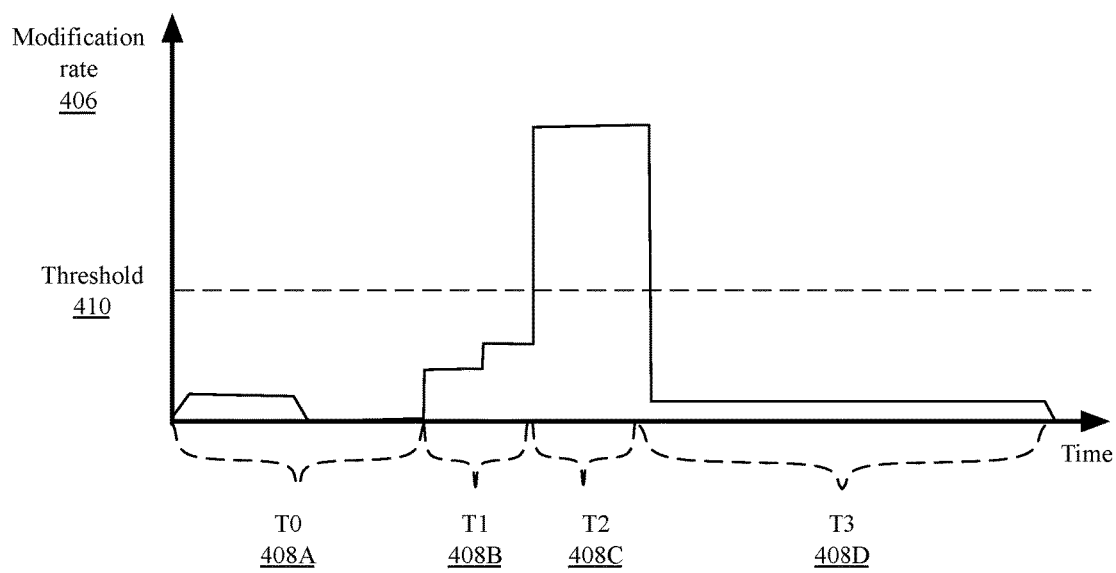

FIGS. 4A and 4B are graphs of examples of file modifications 402 and a modification rate 406 over time, according to one implementation. Referring first to FIG. 4A, the graph shows an example of file modification activity in a system or client device over a period of time as various files are modified by a user, by an application, by the operating system, or by a malicious actor such as a virus, worm, trojan application, remote hacker, etc. At a first time T0 404A, a few files may be modified and long pauses may occur during which no files are modified. This may represent typical use by a user, such as working on one or two documents, and then pausing to perform research or leaving the computer for a period.

At time T2 404C, a very large number of files may be modified in a short time period. This may represent legitimate activity, such as installation of a new large program or operating system update, or may represent illegitimate or malicious activity, such as a trojan or virus encrypting, modifying, or deleting files as quickly as possible before a user can stop it.

At time T3 404D, the modifications may be complete and the number of modifications may remain the same or increase slowly, as in typical usage at time T0. This may be because a legitimate application installation or update is complete, or because a virus or trojan application has finished performing its tasks and the damage is done.

FIG. 4B is a graph illustrating the modification rate or derivative of the numbers of modification over time for the same example activity as FIG. 4A. As shown at T0 408A, the modification rate may be low, showing modifications and pauses as discussed above. As shown at time T1 408B, the modification rate may be higher, showing modifications to several files at a steady rate. At time T2 408C, the modification rate may be much higher as many files are modified. Finally, at time T3, 408D the modification rate may return to a much lower or more typical rate.

The backup agent may monitor the modification rate relative to a threshold 410, which may be set to a level such that typical user-directed file modification behavior is below the threshold, while atypical and possibly suspect file modification behavior is above the threshold. In some implementations, the threshold may be predetermined by an administrator, while in other implementations, the threshold may be dynamically set by a backup server based on an aggregated threshold from a plurality of client devices. For example, each client device may periodically report modification rates, or minimum, maximum, and/or average modification rates within a time period. With a large sample of backup clients, these modification rates may be aggregated to determine typical or expected modification rate values. A threshold may be set based on the rates, such as 95% of the aggregated maximum rate, or 120% of the aggregated average rate, or any other such value based on the variability and statistical confidence of the data. For example, given a very large sample with maximum file modification rates within 1-2% of each other, a threshold may be set to 95% of the average maximum rate. Similarly, given a smaller sample with maximum file modification rates within 20% of each other, a threshold may be set to 85% of the average maximum rate. Other values may be used based on the sample size and range. In some implementations, the threshold may be set below the expected maximum rate, ensuring that file modifications with rates at or above the expected maximum rate will be flagged for further investigation. In other implementations, to reduce false positives, the threshold may be set above the expected maximum rate, such that only unexpected or atypical file modification rates will be flagged for investigation. This may be adequate, as ransomware or viruses typically attempt to modify files as quickly as possible before the user can interrupt execution of the program. In some implementations, the backup server may aggregate modification rate data and provide a suggested threshold to the backup agent. A user may then modify the suggested threshold based on their own risk tolerance.

In another implementation, malicious activity may be determined through files that are modified to be no longer compressible. For example, as noted above, some malicious programs encrypt user files and attempt to extort a ransom from the user to unlock their files. Such files may have been compressible before being encrypted (e.g. text documents, spreadsheets, financial or business records, or any other such data), and may not be compressible after encryption. A backup agent may attempt to compress files for transmission to a backup server to save bandwidth and/or storage space. In some implementations, the backup agent may determine that a file that was previously compressible is no longer compressible. In a further implementation, the backup agent may maintain a status file identifying that a backed up file was previously able to be compressed by some percentage during a previous backup operation, and can no longer be compressed by a similar percentage. In other implementations, the backup agent may determine that a file that should be compressible, based on file type, is not compressible. In still other implementations, the backup agent may look for text files created at approximately the same time as other files are modified, the created files including keywords corresponding to decryption or ransom instructions. Furthermore, although discussed in terms of a backup agent on the client device, in many implementations, malicious activity detection may be performed by an agent on a backup server from backup status files obtained from each client. As the backup status files include file creation and modification information (and potentially compression information), the backup status files may be analyzed by the server to detect malicious activity.

Figure 4C:
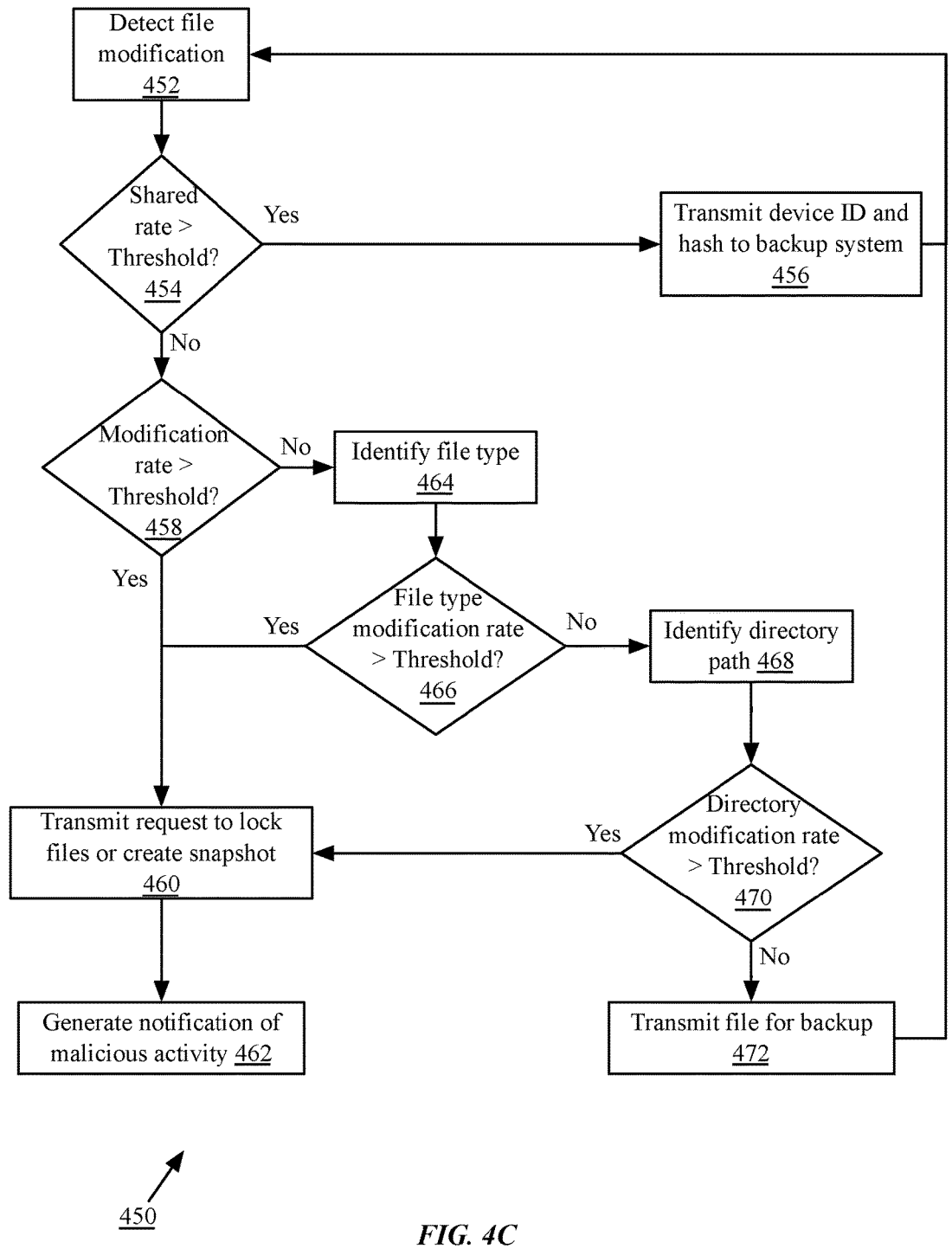
FIG. 4C is a flow chart of an implementation of a method for malicious activity detection in an online backup system.

FIG. 4C is a flow chart of a method 450 for malicious activity detection in an online backup system. At step 452, a backup agent executing on a client device may detect modification to a file. In some implementations, a backup agent may monitor file system read/write operations. In other implementations, a backup agent may receive a callback from an operating system and/or application responsive to modification or creation of a file. In still other implementations, a backup agent may perform periodic scans for new or modified files since a previous scan. In many implementations, the backup agent may detect file creation or modification anywhere in storage of the client device, including within system files, libraries, registry files, log files, preference files, plug-ins, extensions, applications, data files, or any other type and form of file or data.

At step 454, the backup agent may determine if the commonality or shared rate for the modified file exceeds a first predetermined threshold, as discussed above in connection with section B. In some implementations, this may comprise calculating a hash of the modified file or fragment, establishing a connection with a backup server, and transmitting the hash result with a query for the corresponding shared rate of the modified file. If the shared rate exceeds the threshold, then at step 456, the backup agent may transmit a device identifier of the device and the hash result to a backup server for association in a hash data table, as discussed above in connection with section A. This may be occurring in instances in which a client device performs an update to a common file that has previously been recognized as a legitimate update with a shared rate above the threshold.

If the shared rate does not exceed the threshold, then at step 458, the backup agent may determine if the modification rate exceeds a second predetermined threshold. As discussed above, the threshold may be predetermined by an administrator, while in other implementations, the threshold may be dynamically set by a backup server based on an aggregated threshold from a plurality of client devices. In some implementations, any modifications to files may be included in the modification rate analysis at step 458, while in other implementations, only modifications to user files (e.g. text documents, spreadsheets, financial or business records, or other such data) may be included. For example, in one such implementation, only modifications to files including predetermined file types or extensions (e.g. .DOC, .PDF, .XLS, .TXT, etc.) may be analyzed, with modifications to other files (e.g. .EXE, .DLL, .SYS, etc.) ignored or filtered from the analysis. In still other implementations, modifications that change files from compressible to non-compressible may be included in the analysis, indicating that the files were likely encrypted.

If the modification rate exceeds the threshold, then in some implementations, at step 460, the backup agent may transmit a request to a backup server to lock a prior version of the file from being overwritten or create a snapshot of the file prior to the modification. In some implementations, locking the prior version of the file or fragment may comprise adding a flag or predetermined string to an entry in the hash data table for the hash value corresponding to the prior version of the file, or otherwise annotating or marking the file as not to be overwritten with the new, modified version of the file. In other implementations, a snapshot of the file or fragment may be created as of the prior version of the file by consolidating any base or complete files or fragments and applying differences identified in subsequent differential files or fragments until reaching the prior version of the file.

At step 462, the backup agent may generate a notification of potentially malicious activity and may present the notification to a user or administrator of the device. The notification may include an identification of modified files, a modification rate, an expected or aggregate modification rate, a process associated with modifying the files (e.g. a process initiating write commands for the file system), a modification timestamp, or any other type and form of information. The user may indicate that the activity was legitimate (such as an installation of a new large application with many files, or importing of many media files from an external storage device), and, in some implementations, the backup agent may send a second request to the backup server to unlock the prior version of the file. Conversely, the user may indicate that the activity was not legitimate, and once any rogue processes are eliminated, may use the backup agent to restore the previous, unmodified version of the file.

If the modification rate is not above the threshold, then in some implementations at step 472 (skipping steps 464-470), the file and/or a hash result of the file may be transmitted to a backup server for archival as discussed above in connection with section A. In such implementations, malicious activity detection may be based solely on the file modification rate and threshold.

In a further implementation, malicious activity detection may be further based on file type modifications. In such an implementation, responsive to determining the total file modification rate is not above a first threshold at step 458, at step 464, a file type for the file may be identified (e.g. photo, music, text document, spreadsheet, application, library, saved game, registry entry, database, etc.). The file type may be identified from metadata of the file, from a header of the file, from a file name or extension, or any other such methods.

At step 466, the backup agent may determine if a corresponding file type-specific modification rate is greater than another threshold. The file type modification rate threshold may also be preconfigured or determined dynamically, including via aggregated data from a large number of client devices. Different thresholds may exist for each file type. For example, browser cache files may be typically modified at a much higher rate than spreadsheets. Similarly, during an upgrade, system library files may be modified at a higher rate as an installer applies patches, than word processing documents modified by an individual author. If the file type-specific modification rate exceeds its corresponding threshold, then the backup agent may transmit a request to lock the files at step 460, and may generate a notification of malicious activity at step 462. If the file-type specific modification rate does not exceed the threshold, then the activity is likely user-initiated, and the file may be transmitted to a backup server at step 472 (skipping steps 468-470).

In a still further implementation, malicious activity detection may be further based on common directory modifications. In such an implementation, responsive to determining the total file modification rate is not above a first threshold at step 458, and/or responsive to determining that the file type-specific modification rate is not above a corresponding threshold at step 466, a directory path for the file may be identified. For each folder or subdirectory along the directory path, the backup agent may determine whether a directory specific modification rate exceeds another threshold. Said threshold may similarly be preconfigured or dynamically set by a backup server, and different thresholds may be set for different directories. For example, a user may import photos from a camera into a photos subdirectory in one operation, and accordingly, the directory may have a high modification rate. This may be expected behavior for such a subdirectory, however, based on aggregated modification data from other client devices. Conversely, a user may not typically edit more than one or two documents at a time in a work folder, closing the documents before modifying others. Additionally, a 'documents' folder may include many different files of many different file types (e.g. text, images, media, spreadsheets, compressed data, etc.). If not enough files exist within the folder, or not enough files of a specific type exist within the folder, even if they are all modified by a malicious ransomware program, the resulting total modification rate or file type-specific modification rates may not exceed the corresponding thresholds at steps 458 and 466. However, by comparing the directory-specific modification rate to a corresponding threshold at step 470, the backup agent may detect the suspect activity and transmit a request to lock files at step 460 and notify the user at step 462. Conversely, if the total, file type-specific, and directory-specific modification rates are all beneath their corresponding thresholds, then at step 472, the modified files and/or their hash results may be transmitted to a backup server for archival.

Although discussed primarily in terms of a backup agent executing on a client, a similar method to method 400 may be performed by a backup manager executing on a server. For example, in some implementations, steps 454, 458, and 464-470 may be performed by the backup server. In such implementations, the backup agent may transmit an identification of the modified file, a recent or present modification rate (e.g. number of file modifications per minute), a file-type specific modification rate, a directory-specific modification rate, a file type, a file directory, or any other such information. The backup server may perform comparisons of the rates to corresponding thresholds determined from an aggregate of other client devices, and may determine to lock files and generate a notification of malicious activity, or store the file and/or record the device identifier with a hash of the file in a hash data table.

Accordingly, the systems and methods discussed herein may be used by a backup server to leverage modification behavior from a large number of client devices to create modification rate thresholds, which may be used to detect abnormal file modification activity and lock prior versions of the files from being overwritten.

In one aspect, the present disclosure is directed to a method for malicious activity detection in an online backup system. The method includes receiving, by a backup agent executed by a first device, a plurality of identifications of modifications of a corresponding plurality of files. The method also includes identifying, by the backup agent, a file modification behavior from the received plurality of identifications. The method further includes determining, by the backup agent, that the identified file modification behavior matches a malicious activity profile; and transmitting, by the backup agent to a backup system of a second device, a request to prevent modification of previously backed up data of the first device, responsive to the identification.

In some implementations, the file modification behavior comprises a rate of modification of files over time, and the method includes determining that the identified file modification behavior matches the malicious activity profile comprises determining that the rate of modification of files over time exceeds a first threshold. In a further implementation, the method includes receiving, by the backup agent from the backup system, an identification of the first threshold, the first threshold determined by the backup system based on an aggregated rate of modification of files from a plurality of client devices of the backup system. In a still further implementation, the aggregated rate of modification of files comprises an average of maximum rates of modification of files from each of the plurality of client devices of the backup system. In another still further implementation, the aggregated rate of modification of files comprises an average of average rates of modification of files from each of the plurality of client devices of the backup system.

In some implementations, the file modification behavior comprises a number of modified files of a predetermined type during a predetermined time window, and the method includes determining that the identified file modification behavior matches the malicious activity profile comprises determining that the number of modified files of the predetermined type during the predetermined time window exceeds a second threshold.

In other implementations, the file modification behavior comprises a directory path of each modified file during a predetermined time window, and the method includes determining that the identified file modification behavior matches the malicious activity profile comprises determining that a number of different directory paths of modified files during the predetermined time window exceeds a third threshold.

In still other implementations, the method includes receiving a request of a user of the first device, by the backup agent, to restore data before the modifications of the plurality of files; transmitting a request, by the backup agent to the backup system, to restore the plurality of files from the previously backed up data of the first device; and receiving, by the backup agent from the backup system, prior versions of the plurality of files. In a further implementation, the method includes transmitting the modified plurality of files to the backup system for archival. In a still further implementation, the method includes transmitting a request to delete the modified plurality of files from archival in the backup system.

In another aspect, the present disclosure is directed to a system for malicious activity detection in an online backup system. The system includes a first device comprising a processor executing a backup agent, a network interface in communication with a backup system of a second device, and a memory unit storing a plurality of files. The backup agent is configured to receive a plurality of identifications of modifications to the plurality of files, and identify a file modification behavior from the received plurality of identifications. The backup agent is also configured to determine that the identified file modification behavior matches a malicious activity profile, and transmit, to the backup system via the network interface, a request to prevent modification of previously backed up data of the first device, responsive to the identification.

In some implementations, the file modification behavior comprises a rate of modification of files over time, and the backup agent is further configured to determine that the rate of modification of files over time exceeds a first threshold. In a further implementation, the backup agent is further configured to receive, from the backup system, an identification of the first threshold, the first threshold identified by the backup system based on an aggregated rate of modification of files from a plurality of client devices of the backup system. In a still further implementation, the aggregated rate of modification of files comprises an average of maximum rates of modification of files from each of the plurality of client devices of the backup system. In another still further implementation, the aggregated rate of modification of files comprises an average of average rates of modification of files from each of the plurality of client devices of the backup system.

In some implementations, the file modification behavior comprises a number of modified files of a predetermined type during a predetermined time window, and the backup agent is further configured to determine that the number of modified files of the predetermined type during the predetermined time window exceeds a second threshold. In other implementations, the file modification behavior comprises a directory path of each modified file during a predetermined time window, and the backup agent is further configured to determine that a number of different directory paths of modified files during the predetermined time window exceeds a third threshold.

In some implementations, the backup agent is further configured to receive a request of a user of the first device to restore data before the modifications of the plurality of files; transmit a request, to the backup system, to restore the plurality of files from the previously backed up data of the first device; and receive, from the backup system, prior versions of the plurality of files. In a further implementation, the backup agent is further configured to transmit the modified plurality of files to the backup system for archival. In a still further implementation, the backup agent is further configured to transmit a request to delete the modified plurality of files from archival in the backup system, responsive to receiving prior versions of the plurality of files.

C. Computing Devices

Figure 5:
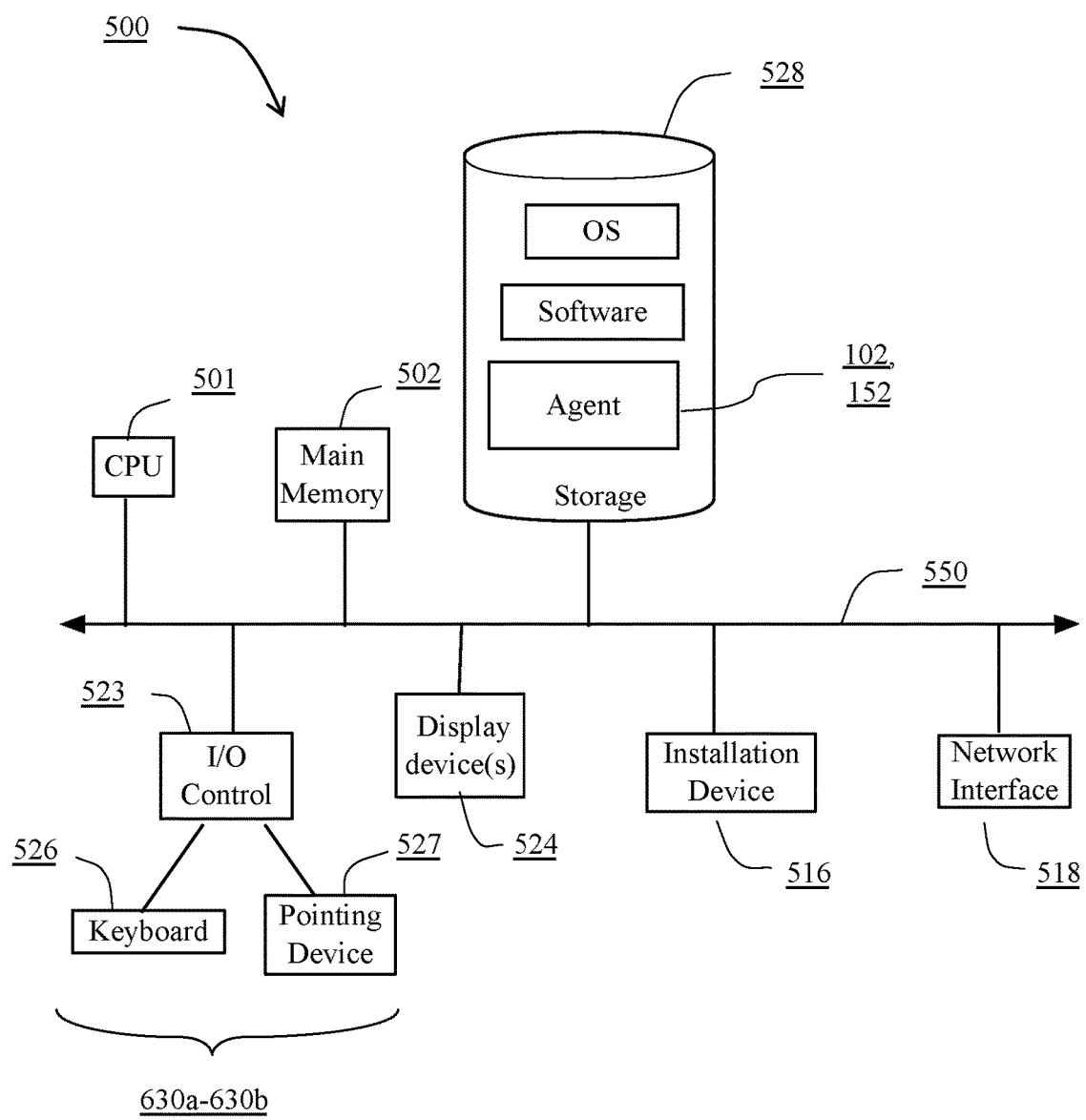
FIG. 5 is a block diagram of an exemplary computing device useful for practicing the methods and systems described herein.

FIG. 5 is a block diagram of an exemplary computing device useful for practicing the methods and systems described herein. The various devices 100, 114 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 5 depicts a block diagram of a computing device 500 useful for practicing an embodiment of the user devices 100 or device of an online storage or backup provider 114. A computing device 500 may include a central processing unit 501; a main memory unit 502; a visual display device 524; one or more input/output devices 530a-530b (generally referred to using reference numeral 530), such as a keyboard 526, which may be a virtual keyboard or a physical keyboard, and/or a pointing device 527, such as a mouse, touchpad, or capacitive or resistive single- or multi-touch input device; and a cache memory 540 in communication with the central processing unit 501.

The central processing unit 501 is any logic circuitry that responds to and processes instructions fetched from the main memory unit 502 and/or storage 528. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 502 may be one or more memory chips capable of storing data and allowing any storage location to be directly accessed by the microprocessor 501, such as random access memory (RAM) of any type. In some embodiments, main memory unit 502 may include cache memory or other types of memory.

The computing device 500 may support any suitable installation device 516, such as a floppy disk drive, a CD-ROM drive, a CD-R/RW drive, a DVD-ROM drive, tape drives of various formats, USB/Flash devices, a hard-drive or any other device suitable for installing software and programs such as any backup agent or client agent 520, a backup manager, or portion thereof. The computing device 500 may further comprise a storage device 528, such as one or more hard disk drives or redundant arrays of independent disks, for storing an operating system and other related software, and for storing application software programs such as any program related to the backup manager or backup agent 520.

Furthermore, the computing device 500 may include a network interface 518 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 518 may comprise a built-in network adapter, network interface card, PCMCIA network card, card bus network adapter, wireless network adapter, USB network adapter, cellular modem or any other device suitable for interfacing the computing device 500 to any type of network capable of communication and performing the operations described herein.

A wide variety of I/O devices 530a-530n may be present in the computing device 500. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 530 may be controlled by an I/O controller 523 as shown in FIG. 5. The I/O controller may control one or more I/O devices such as a keyboard 526 and a pointing device 527, e.g., a mouse, optical pen, or multi-touch screen. Furthermore, an I/O device may also provide storage 528 and/or an installation medium 516 for the computing device 500. The computing device 500 may provide USB connections to receive handheld USB storage devices such as the USB Flash Drive line of devices manufactured by Twintech Industry, Inc. of Los Alamitos, Calif.

The computing device 500 may comprise or be connected to multiple display devices 524a-524n, which each may be of the same or different type and/or form. As such, any of the I/O devices 530a-530n and/or the I/O controller 523 may comprise any type and/or form of suitable hardware, software embodied on a tangible medium, or combination of hardware and software to support, enable or provide for the connection and use of multiple display devices 524a-524n by the computing device 500. For example, the computing device 500 may include any type and/or form of video adapter, video card, driver, and/or library to interface, communicate, connect or otherwise use the display devices 524a-524n. A video adapter may comprise multiple connectors to interface to multiple display devices 524a-524n. The computing device 500 may include multiple video adapters, with each video adapter connected to one or more of the display devices 524a-524n. Any portion of the operating system of the computing device 500 may be configured for using multiple displays 524a-524n. Additionally, one or more of the display devices 524a-524n may be provided by one or more other computing devices, such as computing devices 500a and 500b connected to the S computing device 500, for example, via a network. These embodiments may include any type of software embodied on a tangible medium designed and constructed to use another computer's display device as a second display device 524a for the computing device 500. One ordinarily skilled in the art will recognize and appreciate the various ways and embodiments that a computing device 500 may be configured to have multiple display devices 524a-524n.

A computing device 500 of the sort depicted in FIG. 5 typically operates under the control of an operating system, such as any of the versions of the Microsoft® Windows operating systems, the different releases of the Unix and Linux operating systems, any version of the Mac OS® for Macintosh computers, any embedded operating system, any real time operating system, any open source operating system, any proprietary operating system, any operating systems for mobile computing devices, or any other operating system capable of running on the computing device and performing the operations described herein.

The computing device 500 may have different processors, operating systems, and input devices consistent with the device. For example, in one embodiment, the computer 500 is an Apple iPhone or Motorola Droid smart phone, or an Apple iPad or Samsung Galaxy Tab tablet computer, incorporating multi-input touch screens. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed is:

1. A method comprising: detecting, by a backup system in communication with multiple computing devices, legitimate file activity occurring on the multiple computing devices, wherein the legitimate file activity comprises sharing a file;
calculating, by the backup system, at least one file activity threshold based on patterns of the legitimate file activity occurring over time on different ones of the multiple computing devices;
detecting, by a backup agent in communication with the backup system, a plurality of client file activities occurring over time on a client device of the multiple computing devices;
and preventing, by the backup agent, modification of previously backed up data of the client device responsive to the client file activities exceeding the file activity threshold wherein the calculating of the file activity threshold comprises:
aggregating, by the backup system, file activity rates received from the computing devices;
and setting, by the backup system, the file activity threshold by multiplying the file activity rates by a percentage based on statistical confidence of the file activity rates.

2. The method of claim 1, wherein the calculating comprises identifying different ones of the patterns of the legitimate file activity for different rates of file sharing.

3. The method of claim 1, wherein the calculating comprises identifying different ones of the patterns of the legitimate file activity for different operators of the computing devices.

4. The method of claim 3, wherein the different operators comprise: computer systems of the computing devices; applications operating on the computing devices; and users, and wherein the calculating comprises generating different ones of the patterns for the computer systems, the applications, and the users.

5. The method of claim 1, wherein the calculating comprises identifying different ones of the patterns of the legitimate file activity for different rates of file modification over time.

6. The method of claim 1, wherein the detecting comprises receiving, by the backup system from the computing devices, minimum, maximum, and average file activity rates within a time period.

7. The method of claim 1, wherein the calculating comprises identifying different ones of the patterns of the legitimate file activity for a new hash value for a file or file fragment.

8. A method comprising: detecting, by a backup system in communication with multiple computing devices, legitimate file activity occurring on the multiple computing devices, wherein the legitimate file activity comprises modifying a file and sharing a file;
calculating, by the backup system, at least one file activity threshold based on patterns of the legitimate file activity occurring over time on different ones of the multiple computing devices, wherein the file activity threshold comprises an aggregated threshold from the multiple computing devices;
detecting, by a backup agent in communication with the backup system, a plurality of client file activities occurring over time on a client device of the multiple computing devices;
and preventing, by the backup agent, modification of previously backed up data of the client device responsive to the client file activities exceeding the file activity threshold, wherein the calculating of the file activity threshold comprises:
aggregating, by the backup system, file activity rates received from the computing devices;

and setting, by the backup system, the file activity threshold by multiplying the file activity rates by a percentage based on statistical confidence of the file activity rates.

9. The method of claim 8, wherein the calculating comprises identifying different ones of the patterns of the legitimate file activity for different rates of file modification and different rates of file sharing.

10. The method of claim 8, wherein the calculating comprises identifying different ones of the patterns of the legitimate file activity for different operators of the computing devices.

11. The method of claim 10, wherein the different operators comprise: computer systems of the computing devices; applications operating on the computing devices; and users, and wherein the calculating comprises generating different ones of the patterns for the computer systems, the applications, and the users.

12. The method of claim 8, wherein the calculating comprises identifying different ones of the patterns of the legitimate file activity for different rates of file modification over time.

13. The method of claim 8, wherein the detecting comprises receiving, by the backup system from the computing devices, minimum, maximum, and average file activity rates within a time period.

14. The method of claim 8, wherein the calculating comprises identifying different ones of the patterns of the legitimate file activity for a new hash value for a file or file fragment.

15. A system comprising: a backup system comprising a hardware processor coupled to a memory and a network interface in communication with multiple computing devices, wherein the backup system detects legitimate file activity occurring on the multiple computing devices, wherein the legitimate file activity comprises modifying a file and sharing a file, and wherein the backup system calculates at least one file activity threshold based on patterns of the legitimate file activity occurring over time on different ones of the multiple computing devices;

and a backup agent operating on a client device of the multiple computing devices and being in communication with the backup system, wherein the backup agent detects a plurality of client file activities occurring over time on the client device, and wherein the backup agent prevents modification of previously backed up data of the client device responsive to the client file activities exceeding the file activity threshold wherein the backup system calculates the file activity threshold by:

aggregating file activity rates received from the computing devices;

and setting the file activity threshold by multiplying the file activity rates by a percentage based on statistical confidence of the file activity rates.

16. The system of claim 15, wherein the backup system calculates the file activity threshold by identifying different ones of the patterns of the legitimate file activity for different rates of file modification and different rates of file sharing.

17. The system of claim 15, wherein the backup system calculates the file activity threshold by identifying different ones of the patterns of the legitimate file activity for different operators of the computing devices.

18. The system of claim 17, wherein the different operators comprise: computer systems of the computing devices; applications operating on the computing devices; and users, and wherein the backup system calculates the file activity threshold by generating different ones of the patterns for the computer systems, the applications, and the users.

19. The system of claim 15, wherein the backup system calculates the file activity threshold by identifying different ones of the patterns of the legitimate file activity for different rates of file modification over time.

20. The system of claim 15, wherein the backup system receives minimum, maximum, and average file activity rates within a time period from the computing devices.

* * * * *